US012217567B2

(12) United States Patent
Shepherd et al.

(10) Patent No.: US 12,217,567 B2
(45) Date of Patent: *Feb. 4, 2025

(54) SYSTEM AND METHOD FOR TRANSFERRING FUNDS TO AND FROM A GAMING TABLE

(71) Applicant: IGT, Las Vegas, NV (US)

(72) Inventors: Jeffery Shepherd, Reno, NV (US); Kevin Higgins, Reno, NV (US); Erik Petersen, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,610

(22) Filed: Apr. 6, 2023

(65) Prior Publication Data

US 2023/0245523 A1 Aug. 3, 2023

Related U.S. Application Data

(63) Continuation of application No. 17/517,281, filed on Nov. 2, 2021, now Pat. No. 11,816,951, which is a continuation of application No. 16/920,922, filed on Jul. 6, 2020, now Pat. No. 11,183,007, which is a continuation of application No. 16/272,548, filed on Feb. 11, 2019, now Pat. No. 10,706,667.

(51) Int. Cl.
*G07F 17/32* (2006.01)

(52) U.S. Cl.
CPC ........ *G07F 17/322* (2013.01); *G07F 17/3223* (2013.01); *G07F 17/3248* (2013.01)

(58) Field of Classification Search
CPC . G07F 17/322; G07F 17/3223; G07F 17/3248
See application file for complete search history.

(56) References Cited

U.S. PATENT DOCUMENTS

| | | | | |
|---|---|---|---|---|
| 7,699,703 | B2 | 4/2010 | Muir et al. | |
| 7,771,272 | B2 | 8/2010 | Soltys et al. | |
| 8,087,983 | B2 | 1/2012 | Longway | |
| 8,506,387 | B2 | 8/2013 | Brosnan et al. | |
| 8,800,993 | B2 | 8/2014 | Blaha et al. | |
| 8,876,608 | B2 | 11/2014 | Shepherd et al. | |
| 9,672,686 | B2 | 6/2017 | Nguyen | |
| 9,811,973 | B2 | 11/2017 | Nguyen | |
| 9,916,723 | B2 | 3/2018 | Arnone et al. | |
| 9,916,735 | B2 | 3/2018 | Chun | |
| 10,970,968 | B2 * | 4/2021 | Higgins | G07F 17/3223 |
| 2005/0288083 | A1 | 12/2005 | Downs | |
| 2007/0060326 | A1 | 3/2007 | Juds et al. | |
| 2015/0087377 | A1 | 3/2015 | Yee et al. | |
| 2015/0243133 | A1 | 8/2015 | Nicholas | |
| 2016/0284166 | A1 | 9/2016 | Nelson et al. | |
| 2017/0024738 | A1 | 1/2017 | Vaidyanathan | |
| 2017/0092037 | A1 | 3/2017 | Snow et al. | |
| 2017/0092054 | A1 | 3/2017 | Petersen et al. | |
| 2017/0148249 | A1 | 5/2017 | Richardson | |

(Continued)

*Primary Examiner* — Ronald Laneau
(74) *Attorney, Agent, or Firm* — Neal, Gerber & Eisenberg LLP

(57) ABSTRACT

A system that facilitates the transfer of an amount funds between one or more gaming establishment accounts associated with a player and one or more gaming table components associated with a gaming establishment gaming table currently associated with the player.

20 Claims, 6 Drawing Sheets

(56) References Cited

U.S. PATENT DOCUMENTS

| | | | | |
|---|---|---|---|---|
| 2018/0047249 | A1 | 2/2018 | Nelson et al. | |
| 2019/0340875 | A1* | 11/2019 | Higgins | G07F 17/3223 |
| 2020/0334943 | A1 | 10/2020 | Shepherd et al. | |
| 2021/0217274 | A1 | 7/2021 | Higgins et al. | |
| 2022/0138845 | A1* | 5/2022 | Shepherd | G06Q 20/102<br>705/38 |
| 2022/0148376 | A1* | 5/2022 | Cleveland | G07F 17/3237 |
| 2022/0198874 | A1 | 6/2022 | Shepherd et al. | |
| 2022/0343726 | A1 | 10/2022 | Azzam et al. | |

* cited by examiner

300

SYSTEM AND METHOD FOR TRANSFERRING FUNDS TO AND FROM A GAMING TABLE

PRIORITY CLAIM

This application is a continuation of, claims the benefit of and priority to U.S. patent application Ser. No. 17/517,281, filed on Nov. 2, 2021, which is a continuation of, claims the benefit of and priority to U.S. patent application Ser. No. 16/920,922, filed on Jul. 6, 2020, now U.S. Pat. No. 11,183,007, which is a continuation of, claims the benefit of and priority to U.S. patent application Ser. No. 16/272,548, filed on Feb. 11, 2019, now U.S. Pat. No. 10,706,667, the entire contents of which is incorporated by reference herein.

BACKGROUND

Gaming tables may enable one or more players to play one or more games wherein a player may be required to place a wager. A dealer may subsequently provide a player one or more playing cards. An award may be based on the player's playing cards and on the amount of the wager.

BRIEF SUMMARY

In certain embodiments, the present disclosure relates to a gaming table component including a gaming table component processor; and a gaming table component memory device that stores a plurality of instructions. When executed by the gaming table component processor, the instructions cause the gaming table component processor to receive data associated with: an amount of funds determined to be withdrawn from a gaming establishment account, and an identified player. When executed by the gaming table component processor responsive to the requested amount of funds being approved from a gaming establishment account server, the instructions cause the gaming table component processor to cause a display, by a display device, of an amount of gaming table chips to be provided to the identified player, wherein the amount of gaming table chips corresponds to the amount of funds.

In certain embodiments, the present disclosure relates to a gaming table component including a gaming table component processor; and a gaming table component memory device that stores a plurality of instructions. When executed by the gaming table component processor, the instructions cause the gaming table component processor to wirelessly receive, from a mobile device, data associated with: an amount of funds determined to be withdrawn from a gaming establishment account accessible via a mobile device application of the mobile device, and an identified player at a seat of a gaming table associated with the gaming table component. When executed by the gaming table component processor responsive to the requested amount of funds being approved from a gaming establishment account server, the instructions cause the gaming table component processor to cause a display, by a display device, of an amount of gaming chips to be provided to the identified player, wherein the amount of gaming chips corresponds to the amount of funds, and cause a wireless transmission of data to the mobile device, said data associated with a fund transfer confirmation to be displayed by the mobile device.

In certain embodiments, the present disclosure relates to a method of operating a gaming table component including receiving data associated with an amount of funds determined to be withdrawn from a gaming establishment account, and an identified player. Responsive to the requested amount of funds being approved from a gaming establishment account server, the method includes displaying, by a display device, an amount of gaming table chips to be provided to the identified player, wherein the amount of gaming table chips corresponds to the amount of funds.

Additional features are described herein, and will be apparent from the following Detailed Description and the figures.

DETAILED DESCRIPTION

Figure 1A:
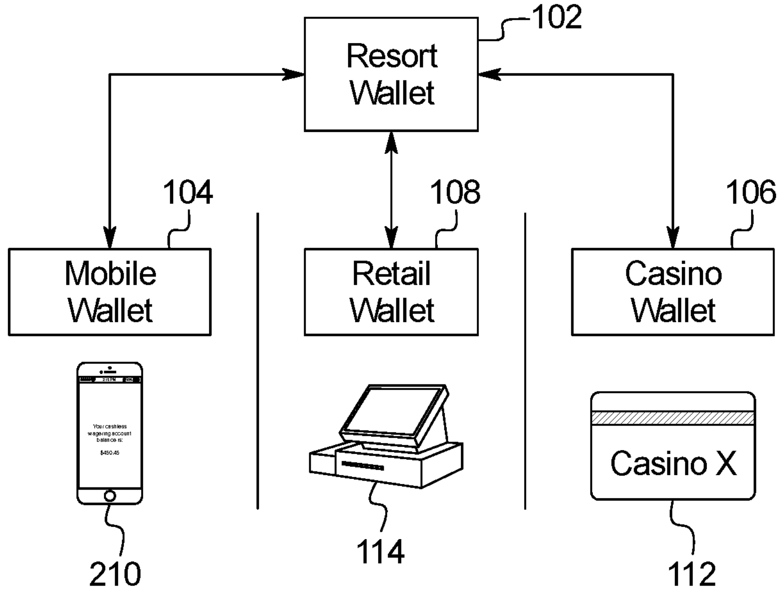
FIG. 1A is an example configuration of the architecture of a plurality of different components of the system disclosed herein.

In various embodiments, the system disclosed herein facilitates the transfer of an amount funds between one or more gaming establishment accounts associated with a player and one or more gaming table components associated with a gaming establishment gaming table.

In certain embodiments, in view of the relatively limited avenues for a player to obtain gaming chips to be wagered at a gaming table, the system provides that the funds maintained in one or more gaming establishment accounts are transferred to a component associated with a gaming table and then exchanged for gaming chips to be played at the gaming table. That is, rather than a player having to bring an amount of cash to a gaming table (to be exchanged by a dealer for a corresponding amount of gaming chips), in certain embodiments, the system enables a player to transfer an amount of funds, such as via a mobile device application executed on the player's mobile device, from a gaming establishment account maintained for that player to a gaming table component, such as a dealer workstation at the gaming table, a fund transfer kiosk at the gaming table, or a mobile workstation of a gaming establishment staff member assigned to service the gaming table. In these embodiments, following the completion of the transfer of the amount of funds from the gaming establishment account maintained for that player to a gaming table component, a gaming establishment personnel associated with the gaming table component, such as the dealer or the gaming establishment staff member, issues an amount of gaming chips (corresponding to the transferred amount of funds) to the player to be wagered at the gaming table.

In certain additional or alternative embodiments, in view of the relatively limited avenues for a player to redeem gaming chips, the system disclosed herein utilizes a component associated with a gaming table to redeem an amount of chips and then cause an amount of funds corresponding to the amount of redeemed gaming chips to be transferred to one or more gaming establishment accounts. That is, rather than a player having to bring an amount of gaming chips from a gaming table to a gaming establishment service station, such as a casino cage, to exchange the gaming chips for cash, in certain embodiments, the system enables a player to provide an amount of gaming chips to a gaming establishment personnel associated with a gaming table component, such as a dealer at a dealer workstation at the gaming table or a gaming establishment staff member associated with a mobile workstation. In these embodiments, following a redemption of an amount of gaming chips, the gaming establishment personnel utilizes the gaming table component, such as the dealer workstation, to facilitate a transfer of an amount of funds (corresponding to the redeemed amount of gaming chips) to a gaming establishment account maintained for that player.

These embodiments which support the bi-directional transfer of funds to and from a gaming table thus provide for a relatively more efficient gaming experience for players (e.g., a player does not need to first obtain cash to bring to a gaming table to be exchanged for gaming chips) and overcomes certain security concerns (e.g., players and/or gaming establishment personnel carrying large sums of cash) associated with both cash-based gaming and ticket voucher-based gaming. Such a configuration further reduces the use of paper ticket vouchers (which certain gaming table dealers may accept for gaming chips) and any ink associated with the production of such paper ticket vouchers to reduce the amount of waste produced by gaming establishments. Such a reduction in the amount of waste produced by gaming establishments provides an environmental benefit of implementing the system disclosed herein.

System Accounts

In various embodiments, the system disclosed herein includes various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (i.e., cashless wagering wallets) and/or gaming establishment retail accounts (i.e., gaming establishment retail wallets) associated with or otherwise maintained for a user, such as a player, collectively form a resort or enterprise account (i.e., an integrated resort or gaming establishment fund management wallet) that the user, such as a player, may access to transfer funds and/or view balance information amongst the various accounts associated with or otherwise maintained for the player or user. As such, the system includes one or more gaming establishment fund management systems that are each associated with or otherwise maintain one or more gaming establishment fund management accounts for a user.

In various embodiments, the gaming establishment fund management system includes or is otherwise associated with one or more cashless wagering systems that are each associated with or otherwise maintain one or more cashless wagering accounts. In certain embodiments, the gaming establishment fund management system includes a first cashless wagering system that maintains a first cashless wagering account, wherein a user utilizes a mobile device application running on a mobile device to facilitate the electronic transfer of any funds between this first cashless wagering account and a gaming table component. For example, as seen in FIG. 1, the resort wallet 102 or enterprise wallet includes or is otherwise in communication with a Mobile Wallet 104 (i.e., a first cashless wagering account maintained by a first cashless wagering system) accessible via the mobile device 210 running a mobile device application as described herein.

In certain embodiments, the gaming establishment fund management system additionally or alternatively includes or is otherwise associated with a second cashless wagering system that maintains a second cashless wagering account associated with a physical instrument, such as a user issued magnetic striped card. In these embodiments, a user utilizes the physical instrument (e.g., via inserting the card into a card reader associated with a gaming table component) to facilitate the electronic transfer of any funds between this second cashless wagering account and the gaming table component. Continuing with the example, as seen in FIG. 1, the resort wallet 102 or enterprise wallet also includes or is otherwise in communication with a Casino Wallet 106 (i.e., a second cashless wagering account maintained by a second cashless wagering system) accessible via a physical instrument, such as a player issued magnetic striped card associated with the second cashless wagering system 112 or a mobile device associated with the second cashless wagering system. It should be appreciated that in certain embodiments, the same cashless wagering account is accessible via both a mobile device application running on a mobile device (to facilitate the electronic transfer of any funds between the cashless wagering account and a gaming table component) and a physical instrument (to facilitate the electronic transfer of any funds between the cashless wagering account and the gaming table component).

In various embodiments, in addition to or an alternative of maintaining one or more cashless wagering accounts via one or more cashless wagering systems, the gaming establishment fund management system includes or is otherwise associated with one or more gaming establishment retail systems that each maintain one or more gaming establishment retail accounts. Such a gaming establishment retail account (i.e., a gaming establishment retail wallet) of a gaming establishment retail system integrates with various retail point-of-sale systems throughout the gaming establishment to enable users to purchase goods and/or services via the user's gaming establishment retail account. Continuing with this example, as seen in FIG. 1, the resort wallet 102 or enterprise wallet further includes or is otherwise in communication with a Retail Wallet 108 (i.e., a gaming establishment retail account maintained by a gaming establishment retail system) accessible via a point-of-sale terminal 114 associated with a gaming establishment.

In certain embodiments (not shown), the gaming establishment fund management system additionally or alternatively includes or is otherwise associated with another sports wagering system that maintains a sports wagering account which is accessible via a mobile device application running on a mobile device and/or a physical instrument, such as a user issued magnetic striped card.

In certain embodiments (not shown), the gaming establishment fund management system is in communication with one or more external funding sources, such as a network of one or more banks or other financial institutions, which maintain one or more external accounts for the user. In certain embodiments, the gaming establishment fund management account is associated with one or more external accounts, such as one or more credit card accounts maintained by one or more financial institutions, one or more debit card accounts maintained by one or more banks or credit unions, one or more financial institution accounts, such as a brokerage account, maintained by one or more financial institutions and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system described herein can be in communication with one or more external funding sources. It should be further appreciated that in different embodiments, the system utilizes a mobile device running a mobile device application, a kiosk, a gaming table component, an electronic gaming machine, a remote host controller service window and/or a gaming establishment interface to facilitate the transfer of funds from a third-party account.

In certain embodiments (not shown), the gaming establishment fund management system (which maintains a gaming establishment fund management account or resort wallet for a user) is in communication with one or more credit systems that each issue the user one or more lines of credit or markers and/or one or more credit reporting/credit risk systems that monitor and report on various accounts associated with the user. It should be appreciated that while described as the gaming establishment fund management system being in communication with one or more credit systems and/or one or more credit reporting/credit risk systems, in different embodiments, any component or subsystem described herein can be in communication with one or more credit systems and/or one or more credit reporting/credit risk systems.

Transferring Funds to and from a Gaming Table Component

In various embodiments, the system disclosed herein enables an identified player at a gaming table to make one or more inputs, such as via a mobile device executing a mobile device application and/or a gaming table fund transfer input device, to initiate a transfer of funds from a gaming establishment account to a gaming table component associated with the gaming table. In these embodiments, once an amount of funds is transferred to the gaming table component, gaming establishment personnel issue the player at the gaming table an amount of gaming chips (corresponding to the amount of transferred funds) for wagering on one or more plays of one or more games at the gaming table.

In one embodiment, the gaming table is an intelligent gaming table which enables one or more players to play one or more suitable games by placing one or more wagers utilizing gaming chips. In this embodiment, the gaming table component is part of (or otherwise associated with) the intelligent gaming table and includes zero, one or more input devices (to receive inputs to facilitate the electronic transfer of funds to and from the gaming table component), and zero, one or more display devices (to display information to the player and/or gaming establishment personnel regarding the electronic transfer of funds to and from the gaming table component). In certain embodiments, the gaming table component additionally includes a communication interface (such as a wireless communication interface to communicate with a mobile device regarding the electronic transfer of funds to and from the gaming table component) and/or a printer (to generate a receipt regarding the electronic transfer of funds to and from the gaming table component).

In another embodiment, the gaming table is a non-intelligent gaming table including a suitable support structure, such as one or more legs, a playing surface and a dealer position. In this embodiment, the gaming table component is separate from but associated with the gaming table and includes zero, one or more input devices (to receive inputs to facilitate the electronic transfer of funds to and from the gaming table component), and zero, one or more display devices (to display information to the player and/or gaming establishment personnel regarding the electronic transfer of funds to and from the gaming table component). In certain embodiments, the gaming table component additionally includes or is otherwise associated with a communication interface (such as a wireless communication interface to communicate with a mobile device regarding the electronic transfer of funds to and from the gaming table component), a player identification device associated with the gaming table (such as a card reader to enable the player to log into the gaming table) and/or a printer (to generate a receipt regarding the electronic transfer of funds to and from the gaming table component).

In another embodiment, regardless of if an intelligent gaming table or a non-intelligent gaming table are utilized, the gaming table component is a mobile gaming table component associated with one or more of such gaming tables. In this embodiment, the mobile gaming table component is associated with gaming establishment personnel. For example, a tablet or mobile device associated with a gaming establishment mobile staff member qualifies as a mobile gaming table component. In these embodiments, the mobile gaming table component includes zero, one or more input devices (to receive inputs to facilitate the electronic transfer of funds to and from the gaming table component), and zero, one or more display devices (to display information to the player and/or gaming establishment personnel regarding the electronic transfer of funds to and from the gaming table component). The mobile gaming table component additionally includes or is otherwise associated with a communication interface (such as a wireless communication interface to communicate with a mobile device regarding the electronic transfer of funds to and from the gaming table component), a player identification device associated with the gaming table (such as a card reader to enable the player to log into the gaming table) and/or a printer (to generate a receipt regarding the electronic transfer of funds to and from the gaming table component).

Figure 1B:
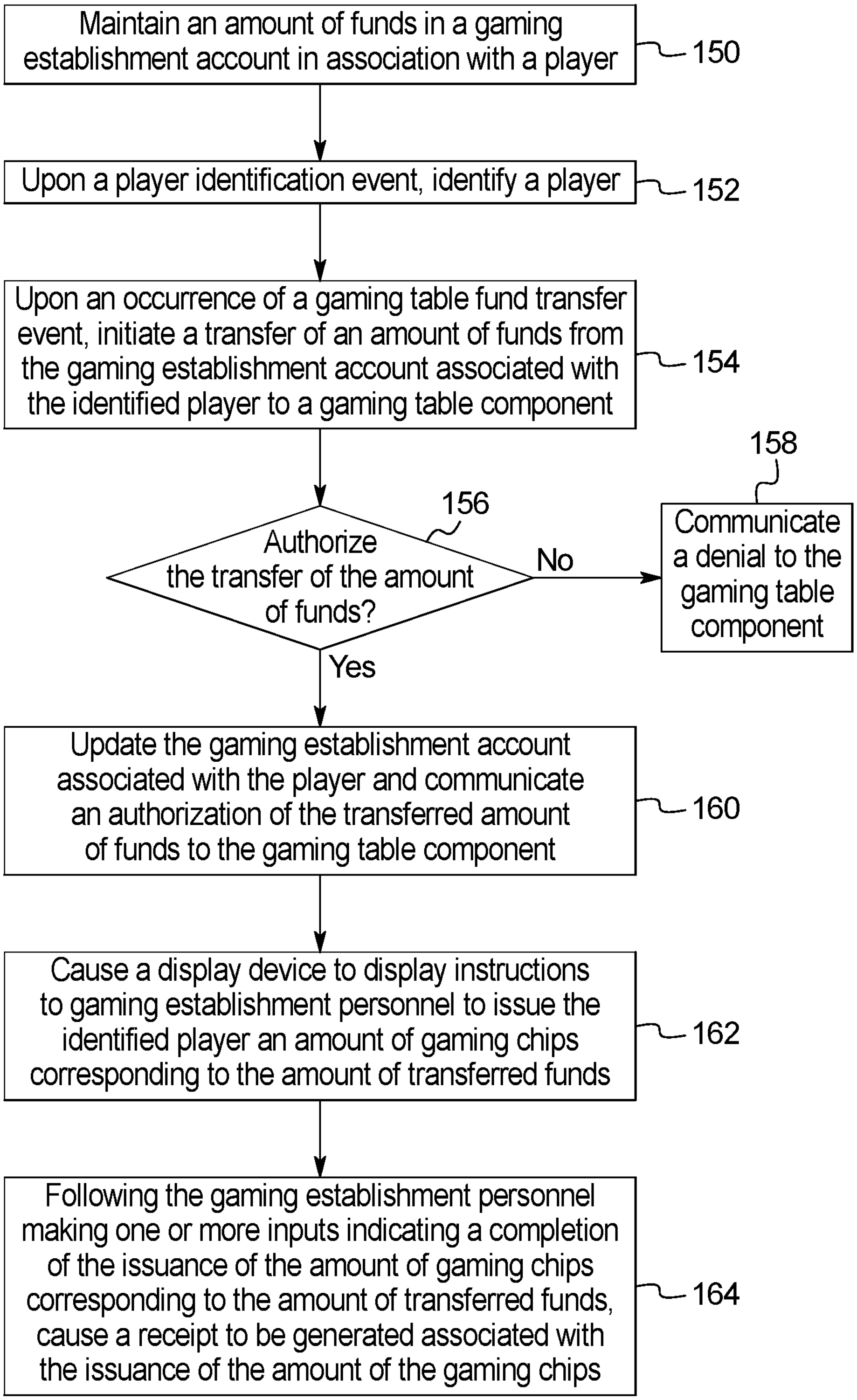
FIG. 1B is a flow chart an example process for operating a system which transfers funds from a gaming establishment account to a gaming table component to then be distributed to a player as gaming chips.

FIG. 1B is a flowchart of an example process or method of operating the system of the present disclosure. In various embodiments, the process is represented by a set of instructions stored in one or more memories and executed by one or more processors. Although the process is described with reference to the flowchart shown in FIG. 1B, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

Figure 2B:
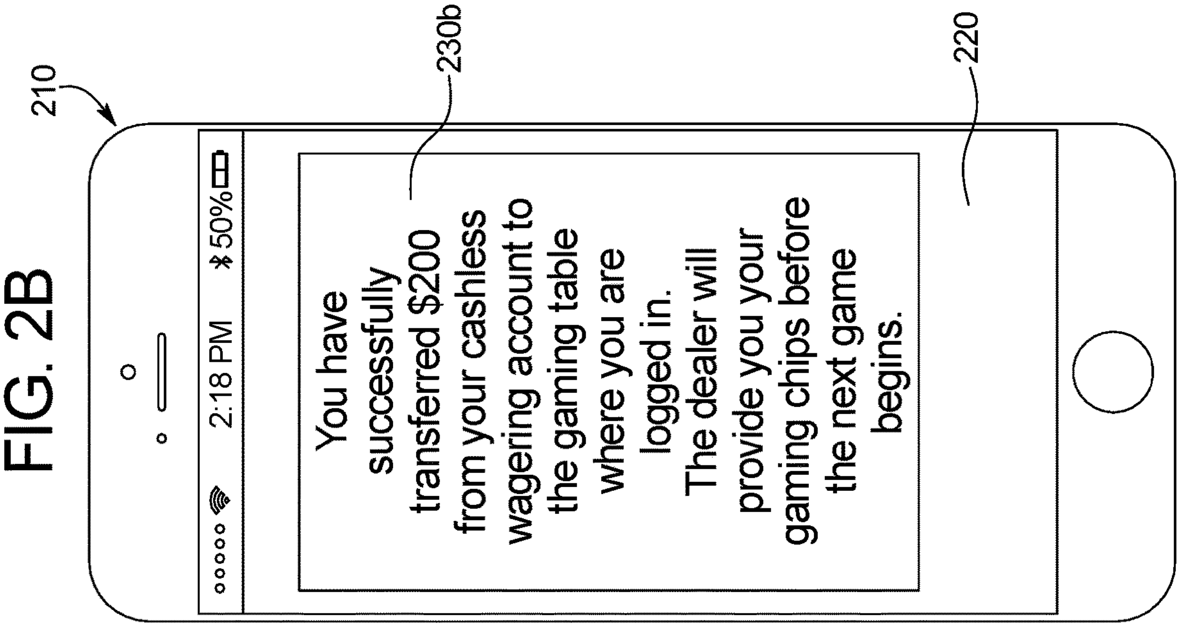
FIGS. 2A, 2B, and 2C are example graphical user interfaces displayed in connection with transferring funds between a gaming establishment account and a gaming table.
Figure 2A:
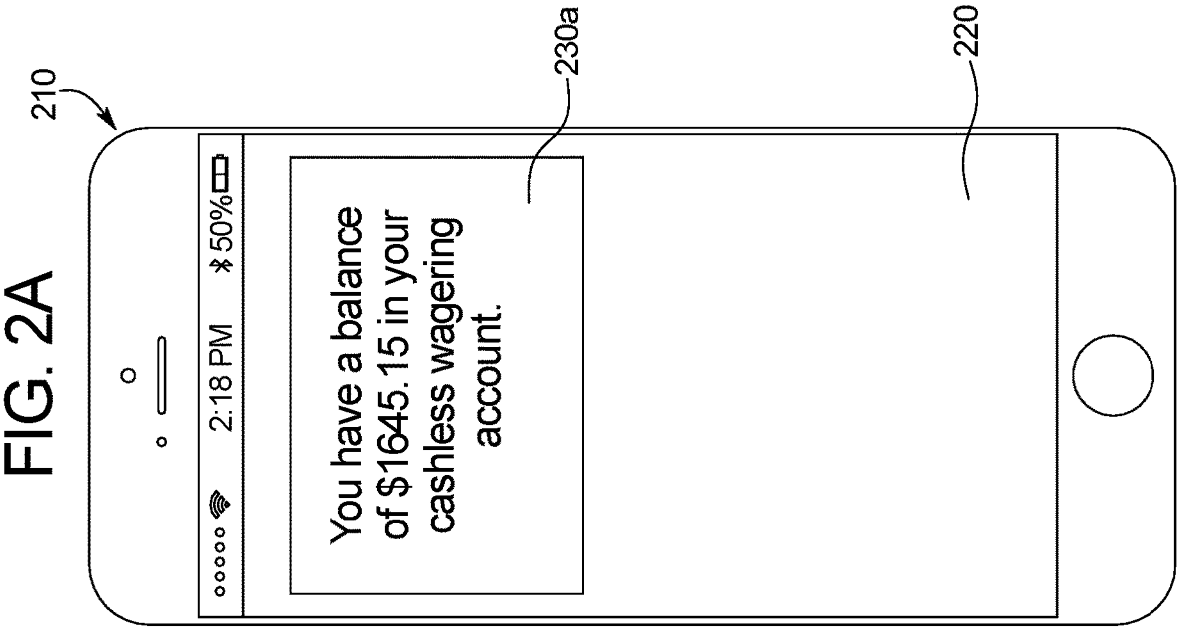

In various embodiments and as described in more detail below, the system maintains an amount of funds in a gaming establishment account in association with a player as indicated in block 150 of FIG. 1B. In certain embodiments, the system enables the user to utilize a mobile device to view an amount of funds maintained in the gaming establishment account associated with that player. For example, as seen in FIG. 2A, a mobile device application 220 of a mobile device 210 displays a message to the player that they have an account balance of $1645.15 in their cashless wagering account 230*a*.

In various embodiments, upon a player identification event, the system identifies a player as indicated by block 152.

In certain embodiments, the system identifies a player at a gaming table (or in an area associated with a gaming table)

by enabling the player to log into the gaming table via inserting or swiping their magnetic striped playing identification card at a card reader associated with the gaming table. In certain embodiments, the system identifies a player by enabling the player to log into a mobile gaming table component, such as a mobile workstation associated with a gaming establishment mobile staff member, via inserting or swiping their magnetic striped playing identification card at a mobile card reader associated with the mobile gaming table component. In certain other embodiments, the system identifies a player at a gaming table (or in an area associated with a gaming table) by enabling the player to log into the gaming table via entering a card number of their playing identification card at an input device, such as a keypad, associated with the gaming table. In certain embodiments, the system identifies a player by enabling the player to log into a mobile gaming table component, such as a mobile workstation associated with a gaming establishment mobile staff member, associated with a gaming establishment mobile staff member via entering a card number of their player identification card at an input device, such as a keypad, of the mobile gaming table component.

In certain other embodiments, the system identifies a player at a gaming table (or in an area associated with a gaming table) by enabling the player to log into an account, such as a player tracking account or the gaming establishment account maintained for the player utilizing a mobile device application. In certain such embodiments, following the launching of the mobile device application, such as following the player selecting an image associated with the account stored via a digital wallet application or following the mobile device application retrieving data associated with a player account stored via a digital wallet application, the mobile device application prompts the player to cause the mobile device to engage a gaming table component, such as prompting the player to tap the mobile device to a card reader or other designated location(s) of the gaming table component. After such engagement (or after the launching of the mobile device application if no mobile device to gaming table component engagement is required), the mobile device application communicates, via a wireless communication protocol, player account data stored by the mobile device to the gaming table component. The gaming table component proceeds with operating with one or more gaming establishment systems, such as a player tracking system, to log the player into the player account at that gaming table. Thereafter, any game play activity is associated with this identified player and the player account (just as if the player would have inserted a physical player tracking card into a player tracking card reader of the gaming table component).

In addition to identifying a player at the gaming table, upon an occurrence of a gaming table fund transfer event, the system initiates a transfer of an amount of funds from the gaming establishment account associated with the identified player to a gaming table component as indicated in block 154 of FIG. 1B.

In certain embodiments, the system enables the identified player to initiate a transfer of an amount of funds from the gaming establishment account associated with the identified player, such as the player's cashless wagering account, to the gaming table component by enabling the player to access the associated gaming establishment account via inserting or swiping their magnetic striped playing account card at a card reader associated with the gaming table. In certain other embodiments, the system enables the identified player to initiate a transfer of an amount of funds from the gaming establishment account associated with the identified player, such as the player's cashless wagering account, to the gaming table component by enabling the player to access the associated gaming establishment account via entering a card number of their playing identification card at an input device, such as a keypad, associated with the gaming table. In these embodiments, using either a universal input device accessible by each of the players at the gaming table or an individual input device associated with an individual position or seat at the gaming table, the system enables the player to make one or more inputs regarding the requested transfer, such as but not limited to inputs to indicate an amount of funds to be transferred, a personal identification number ("PIN"), and/or a confirmation to initiate the transfer of funds. In these embodiments, following receipt of the player inputted data associated with the determined amount of funds to be transferred from the gaming establishment account to the gaming table component, the gaming table component proceeds with operating with one or more gaming establishment systems, such as a gaming establishment cashless wagering system, to log the player into the gaming establishment account associated with the player (if necessary) and request the determined amount of funds to be transferred from the gaming establishment account to the gaming table component.

In certain embodiments, the system enables the identified player to initiate a transfer of an amount of funds from the gaming establishment account associated with the identified player, such as the player's cashless wagering account, to the gaming table component by enabling the player to access the associated gaming establishment account via inserting or swiping their magnetic striped playing account card at a mobile card reader of a mobile gaming table component, such as a mobile workstation associated with a gaming establishment mobile staff member. In certain other embodiments, the system enables the identified player to initiate a transfer of an amount of funds from the gaming establishment account associated with the identified player, such as the player's cashless wagering account, to the gaming table component by enabling the player to access the associated gaming establishment account via entering a card number of their player identification card at an input device, such as a keypad, of a mobile gaming table component, such as a mobile workstation associated with a gaming establishment mobile staff member.

In certain embodiments, the system enables gaming establishment personnel associated with the gaming table, such as the dealer at the gaming table, to initiate a transfer of an amount of funds from the gaming establishment account associated with the identified player, such as the player's cashless wagering account, to the gaming table component. In one such embodiment, following the gaming establishment personnel making one or more inputs to initiate a transfer of an amount of funds from the gaming establishment account associated with the identified player to the gaming table component, the system enables the identified player to confirm the gaming establishment personnel initiated transaction via inserting or swiping their magnetic striped playing account card at a card reader associated with the gaming table. In another such embodiment, following the gaming establishment personnel making one or more inputs to initiate a transfer of an amount of funds from the gaming establishment account associated with the identified player to the gaming table component, the system enables the identified player to confirm the gaming establishment personnel initiated transaction via entering a PIN and/or entering a card number of their playing identification card at an input device, such as a keypad, associated with the gaming table. In these embodiments, using a universal input device accessible by each of the players at the gaming table, an individual input device associated with an individual position or seat at the gaming table and/or a mobile device application, the system enables the player to make one or more inputs to confirm and/or authorize an amount of funds to be transferred. In another such embodiment, following the gaming establishment personnel making one or more inputs to initiate a transfer of an amount of funds from the gaming establishment account associated with the identified player to the gaming table component, the system enables the identified player to confirm the gaming establishment personnel initiated transaction via the player making one or more confirmation inputs utilizing a mobile device application. In these embodiments, following receipt of the player inputted data associated with the confirmation of the gaming establishment personnel initiated transfer from the gaming establishment account to the gaming table component, the gaming table component proceeds with operating with one or more gaming establishment systems, such as a gaming establishment cashless wagering system, to log the player into the gaming establishment account associated with the player (if necessary) and request the determined amount of funds to be transferred from the gaming establishment account to the gaming table component.

In certain other embodiments, the system enables the identified player to initiate a transfer of an amount of funds from the gaming establishment account associated with the identified player, such as the player's cashless wagering account, to the gaming table component via enabling the player to facilitate the transfer of an amount of funds from the gaming establishment account to the gaming table component utilizing the mobile device application. In certain such embodiments, following the launching of the mobile device application or following the mobile device application retrieving data associated with a gaming establishment account, such as a cashless wagering account, stored via a digital wallet application, the mobile device application determines an amount of funds to be transferred from the gaming establishment account to the gaming table component.

In one embodiment, the mobile device application (and/or the universal input device accessible by each of the players at the gaming table and/or an individual input device associated with an individual position or seat at the gaming table) enables the player to input an amount of funds to be transferred from the gaming establishment account to the gaming table component. In another embodiment, the mobile device application (and/or the universal input device accessible by each of the players at the gaming table and/or an individual input device associated with an individual position or seat at the gaming table) enables the player to specify an amount of gaming chips. In this embodiment, the mobile device application (or the gaming table component) converts the requested amount of gaming chips to an amount of funds to be transferred from the gaming establishment account to the gaming table component. For example, an identified player requests three red chips and five blue chips and the system transacts with the cashless wagering system which maintains the player's cashless wagering account to request a transfer of an amount of funds that corresponds to three red chips and five blue chips.

In one embodiment, the mobile device application (and/or the universal input device accessible by each of the players at the gaming table and/or an individual input device associated with an individual position or seat at the gaming table) enables the player to select an amount of funds to be transferred from a listing of available amounts of funds to be transferred from the gaming establishment account to the gaming table component. In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the gaming table associated with the gaming table component, such as based on the denomination, game type, minimum bet and/or maximum available wager amount of the gaming table associated with the gaming table component. In one embodiment, the mobile device application includes more than one listing of available amounts of funds to be transferred. In this embodiment, the mobile device application includes one listing of available amounts for an initial transfer of funds to the gaming table component for a gaming session and another listing of available amounts for a subsequent transfer of funds to the gaming table component for an existing gaming session.

In another embodiment, the mobile device application (and/or the universal input device accessible by each of the players at the gaming table and/or an individual input device associated with an individual position or seat at the gaming table) determines a default amount of funds to be transferred from the gaming establishment account to the gaming table component. In one such embodiment, the default amount of funds includes the last amount of funds transferred from the gaming establishment account to the gaming table component. The mobile device application displays to the player such a default amount of funds to be transferred. In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's account balance, or the player's status. In one embodiment, the mobile device application (and/or the universal input device accessible by each of the players at the gaming table and/or an individual input device associated with an individual position or seat at the gaming table) includes more than one default amount of funds to be transferred. In this embodiment, the mobile device application includes one default amount for an initial transfer of funds to the gaming table component for a gaming session and another default amount for a subsequent transfer of funds to the gaming table component for an existing gaming session.

In certain embodiments, following the determination of an amount of funds to be transferred from the gaming establishment account to the gaming table component, the mobile device application prompts the player to cause the mobile device to engage the gaming table component, such as prompting the player to tap the mobile device to a player tracking card reader or other designated location(s) of the gaming table component. After such engagement (or after the determination of an amount of funds to be transferred if no mobile device to gaming table component engagement is required), the mobile device application communicates, via a wireless communication protocol, data associated with the determined amount of funds to be transferred from the gaming establishment account to the gaming table component. The gaming table component proceeds with operating with one or more gaming establishment systems, such as a gaming establishment cashless wagering system, to log the player into the gaming establishment account associated with the player (if necessary) and request the determined amount of funds to be transferred from the gaming establishment account to the gaming table component.

In another embodiment, rather than prompting the player to engage the gaming table component with the mobile device and the subsequent engagement of the gaming table component with the mobile device, the mobile device application automatically determines to transfer a default amount of funds, such as the last transferred amount of funds, from the gaming establishment account to the gaming table component. In this embodiment, the mobile device application communicates, via a wireless communication protocol, data associated with the determined amount of funds to be transferred from the gaming establishment account to the gaming table component. The gaming table component proceeds with operating with one or more gaming establishment systems to log the player into the gaming establishment account associated with the player (if necessary) and request the determined amount of funds to be transferred from the gaming establishment account to the gaming table component.

In these embodiments, regardless of if the player (or gaming establishment personnel) initiated the transfer of funds from the gaming establishment account to the gaming table component using a mobile device or a physical instrument (e.g., a player issued magnetic striped card associated with a cashless wagering system), following the gaming table component requesting the determined amount of funds, the gaming establishment system, such as the cashless wagering system, determines whether to authorize the transfer of the determined amount of funds as indicated in diamond 156 of FIG. 1B.

If the gaming establishment system determines not to authorize the determined amount of funds, the gaming establishment system communicates a denial to the gaming table component (and/or the mobile device application, if applicable) as indicated in block 158. In certain embodiments, following the denial, one or more display devices associated with the gaming table component (and/or the mobile device application) display a denial of funds transfer to the player.

On the other hand, if the gaming establishment system determines to authorize the determined amount of funds, the gaming establishment system updates the gaming establishment account associated with the player and communicates an authorization of the transferred amount of funds to the gaming table component as indicated in block 160. In certain embodiments, the gaming establishment system reduces a balance of the gaming establishment account by the determined amount of funds. In certain embodiments, the gaming establishment system places the determined amount of funds in escrow wherein the balance of the gaming establishment account is not reduced until such funds are disbursed to the player via the gaming table component confirming the transaction to release the funds from escrow. The gaming table component proceeds with updating a balance of the gaming table component attributable to the player to account for the determined amount of funds. In certain embodiments, before, during or after the disbursement of the determined amount of funds, the gaming table component further proceeds with communicating a transfer of funds confirmation, wherein one or more display devices associated with the gaming table component (and/or the mobile device application, if applicable) display a confirmation of the transfer of the amount of funds. For example, as seen in FIG. 2B, a mobile device application 220 of a mobile device 210 displays a message to the player that they have successfully transferred $200 from their cashless wagering account to the gaming table 230*b*.

Following the completion of the transfer of an amount of funds from the gaming establishment account associated with the identified player to a gaming table component, the gaming table component causes a display device to display instructions to gaming establishment personnel to issue the identified player an amount of gaming chips corresponding to the amount of transferred funds as indicated in block 162 of FIG. 1B.

Figure 2C:
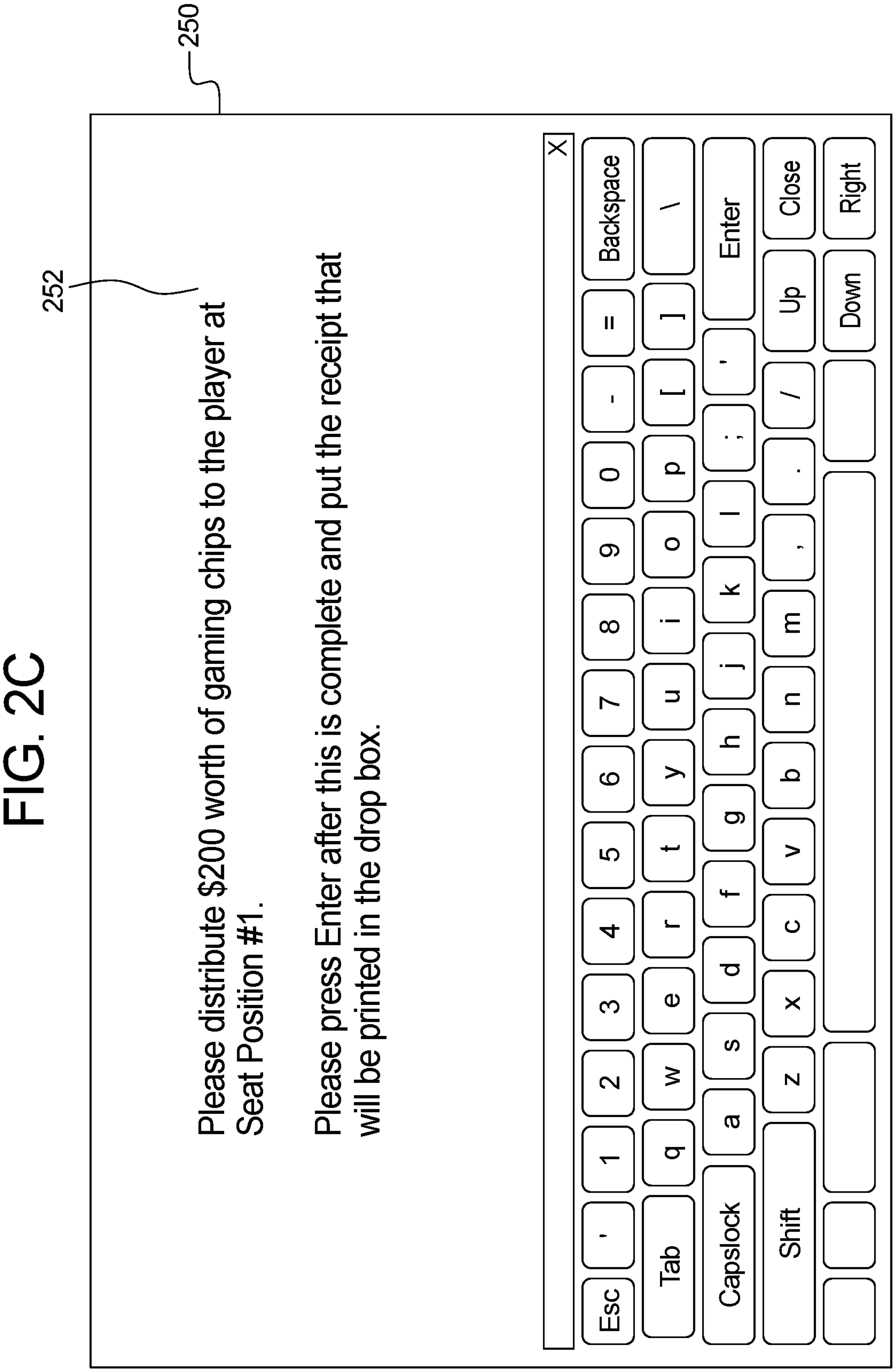
Figure 3:
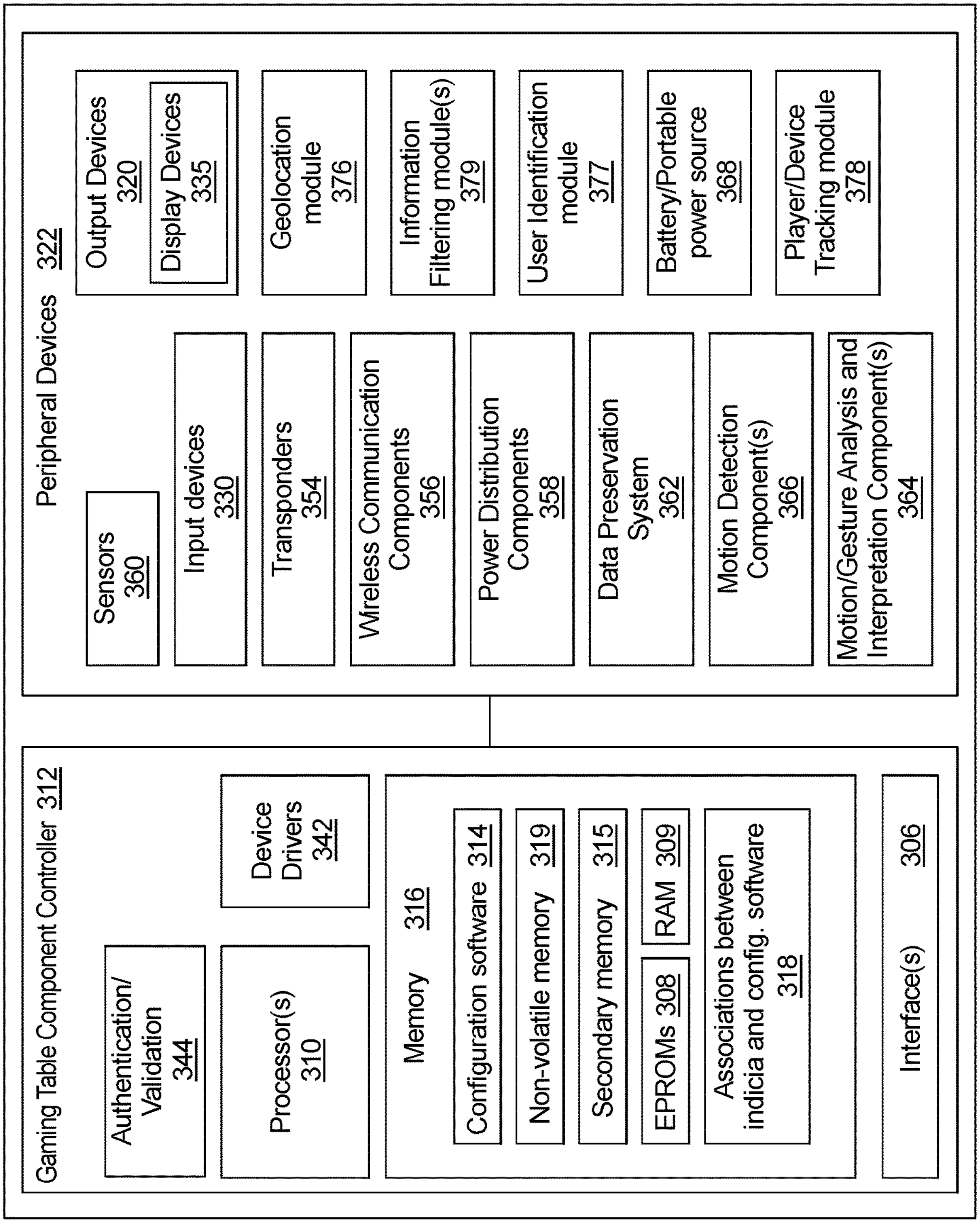
FIG. 3 is a schematic block diagram of one embodiment of a gaming table component of an example system disclosed herein.

In one such embodiment, the gaming table component causes a display device of a dealer workstation to display instructions to a dealer to issue the player an amount of gaming chips corresponding to the amount of transferred funds. For example, as seen in FIG. 2C, following the completion of the transfer of the $200 from the player's cashless wagering account to the gaming table component, the gaming table component utilizes a dealer workstation 250 to inform the dealer to distribute $200 in gaming chips to the identified player 252.

In one such embodiment, the gaming table component causes a display device of a mobile gaming table component, such as a mobile workstation associated with a gaming establishment mobile staff member, to display instructions to a gaming establishment staff member associated with the gaming table to issue the player an amount of gaming chips corresponding to the amount of transferred funds. For example, following the completion of the transfer of the $200 from the player's cashless wagering account to the gaming table component, the gaming table component utilizes a mobile workstation to inform the appropriate gaming establishment personnel to distribute $200 in gaming chips to the identified player.

It should be appreciated that in these embodiments, since the player has already identified themselves to the gaming table component and since the fund transfer requests also includes data identifying the player, the information displayed to the gaming establishment personnel includes identifying information regarding the player to issue the gaming chips to. In one such embodiment, the identifying information includes the player's name. In another such embodiment, the identifying information additionally or alternatively includes the seat at the gaming table where the player is located. In another such embodiment, the identifying information additionally or alternatively includes a picture of the player.

Referring back to FIG. 1B, following the display of instructions to gaming establishment personnel to issue the identified player an amount of gaming chips corresponding to the amount of transferred funds and following the gaming establishment personnel making one or more inputs indicating a completion of the issuance of the amount of gaming chips corresponding to the amount of transferred funds, the gaming table component causes a receipt to be generated associated with the issuance of the amount of gaming chips as indicated in block 166. In one such embodiment, the receipt is a physical receipt which the gaming establishment personnel deposited in a drop box or otherwise retains until submitted to the gaming establishment. In another such embodiment, the receipt is a virtual receipt which is communicated to one or more gaming establishment accounting servers.

It should be appreciated that in these embodiments, since the issuance of chips from an electronic transfer of funds to the gaming table must be accounted for when reconciling the transactions associated with the gaming table, the gaming table component causes the generation of a receipt to memorialize the electronic transaction. For example, if a dealer at a gaming table provides the player a quantity of gaming chips corresponding to the amount of funds electronically transferred from the player's gaming establishment account to the gaming table component, the dealer deposits the printed receipt into a dropbox at the gaming table such that at the end of the dealer's shift, the gaming chip tray is balanced when accounting for the cash which the dealer exchanged for gaming chips and the electronic fund transfers which the dealer exchanged for gaming chips. In another example, if a gaming establishment mobile staff member servicing an area with multiple gaming tables provides a player a quantity of gaming chips corresponding to the amount of funds electronically transferred from the player's gaming establishment account to the mobile gaming table component carried by the mobile staff member, the mobile staff member deposits the printed receipt into a pouch or folder they carry with them such that at the end of the mobile staff member's shift, the gaming chips initially provided to the mobile staff member is balanced when accounting for the cash which the mobile staff member exchanged for gaming chips and the electronic fund transfers which the mobile staff member exchanged for gaming chips.

In another embodiment, in addition to (or alterative from) enabling a player to transfer an amount of funds from a gaming establishment account to a gaming table component (for a subsequent issuance of gaming chips corresponding to the amount of the transfer), the system enables a player to redeem gaming chips which results in a transfer of an amount of funds corresponding to the redeemed gaming chips to a gaming establishment account. That is, the system disclosed herein utilizes a component associated with a gaming table to redeem an amount of gaming chips and then cause an amount of funds corresponding to the amount of redeemed gaming chips to be transferred to one or more gaming establishment accounts. As such and rather than a player having to bring an amount of gaming chips from a gaming table to a gaming establishment service station, such as a casino cage, to exchange the gaming chips for cash, the system enables a player to provide an amount of gaming chips to a gaming establishment personnel associated with a gaming table component, such as a dealer at a dealer workstation at the gaming table or a gaming establishment staff member associated with a mobile workstation. In these embodiments, following a redemption of an amount of gaming chips, the gaming establishment personnel utilizes the gaming table component, such as the dealer workstation, to facilitate a transfer of an amount of funds (corresponding to the redeemed amount of gaming chips) to a gaming establishment account maintained for that player.

More specifically, upon a gaming chip redemption event, such as the player providing a quantity of gaming chips to gaming establishment personnel, a fund amount associated with the redeemed gaming chips as well as other information associated with the redeemed gaming chips, such as details about the gaming chips that were redeemed (e.g., five $10 gaming chips and four $100 gaming chips) are determined and inputted into or otherwise communicated to the gaming table component.

In one embodiment, the gaming establishment personnel determines the fund amount associated with the redeemed gaming chips and inputs, via an input device, the fund amount and other associated information associated with the redeemed gaming chips. For example, a dealer counts the gaming chips redeemed by a player as well as determines details about the types and numbers of gaming chips that were redeemed and inputs such information into a dealer workstation. In another example, a gaming establishment mobile staff member counts the gaming chips redeemed by a player as well as determines details about the types and numbers of gaming chips that were redeemed and inputs such information into a mobile gaming table component, such as a tablet carried by the mobile staff member.

In another embodiment, the gaming table includes or is otherwise associated with a gaming chip acceptor which receives the redeemed gaming chips, determines, such as based on weight and/or size of each redeemed gaming chip, the fund amount associated with the redeemed gaming chips as well as details about the types and numbers of gaming chips that were redeemed, and automatically inputs or otherwise communicates such information to the gaming table component. In another example, a gaming establishment mobile staff member utilizes a gaming chip acceptor which receives the redeemed gaming chips, determines, such as based on weight and/or size of each redeemed gaming chip, the fund amount associated with the redeemed gaming chips as well as details about the types and numbers of gaming chips that were redeemed, and automatically inputs or otherwise communicates such information to a mobile gaming table component, such as a tablet carried by the mobile staff member.

In another embodiment wherein the gaming chips employ radio frequency identification ("RFID"), one or more antennas identify the gaming chips such that the system automatically determines the fund amount associated with the redeemed gaming chips. In one such embodiment, one or more RFID antennas are part of or otherwise associated with the gaming table such that the system reads the gaming chips redeemed, calculates the fund amount associated with the redeemed gaming chips, determines the details about the types and numbers of gaming chips that were redeemed and automatically inputs or otherwise communicates such information to the gaming table component. In another such embodiment, one or more RFID antennas are part of or otherwise associated with a pouch or folder carried by a gaming establishment mobile staff member such that the system reads the gaming chips redeemed, calculates the fund amount associated with the redeemed gaming chips, determines the details about the types and numbers of gaming chips that were redeemed and automatically inputs or otherwise communicates such information to the mobile gaming table component.

In these embodiments, following the redemption of the amount of gaming chips and the determination of the fund amount associated with the redeemed gaming chips as well as the details about the types and numbers of gaming chips that were redeemed, the system enables the player to confirm the gaming chip redemption via inserting or swiping their magnetic striped playing account card at a card reader associated with the gaming table. In another such embodiment, the system enables the identified player to confirm the gaming chip redemption via entering a PIN and/or a card number of their playing identification card at an input device, such as a keypad, associated with the gaming table. In another such embodiment, the system enables the identified player to confirm the gaming chip redemption via the player making one or more confirmation inputs utilizing a mobile device application, such entering a PIN and/or a card number of their playing identification card via the mobile device application. In these embodiments, using a universal input device accessible via each of the players at the gaming table, an individual input device associated with an individual position or seat at the gaming table and/or a mobile device application, the system enables the player to make one or more inputs to confirm and/or authorize an amount of funds to be transferred. In these embodiments, following receipt of the player inputted data associated with the confirmation of the gaming chip redemption, the gaming table component proceeds with operating with one or more gaming establishment systems, such as a gaming establishment cashless wagering system, to log the player into the gaming establishment account associated with the player (if necessary) and transfer the determined amount of funds from the gaming table component to the gaming establishment account maintained for that player.

In these embodiments, regardless of if the player confirmed the transfer of funds from the gaming table component to the gaming establishment account using a mobile device or a physical instrument (e.g., a player issued magnetic striped card associated with a cashless wagering system), the gaming establishment system updates the gaming establishment account associated with the player and communicates an authorization of the transferred amount of funds to the gaming table component. In these embodiments, the gaming establishment system increases a balance of the gaming establishment account by the determined amount of funds. The gaming table component proceeds with updating a balance of the gaming table component associated with the player to account for the transferred amount of funds. In certain embodiments, the gaming table component further proceeds with communicating a transfer of funds confirmation, wherein one or more display devices associated with the gaming table component (and/or the mobile device application, if applicable) display a confirmation of the transfer of the amount of funds for the redeemed gaming chips.

Following the display of information indicating a completion of the transfer of an amount of funds associated with the redeemed gaming chips to a gaming establishment account associated with a player, the gaming table component causes a receipt to be generated associated with the redemption of the amount of gaming chips. In one such embodiment, the receipt is a physical receipt which the gaming establishment personnel deposited in a drop box or otherwise retains until submitted to the gaming establishment. In another such embodiment, the receipt is a virtual receipt which is communicated to one or more gaming establishment accounting servers. In these embodiments, since the redemption of gaming chips at a gaming table which results in an electronic transfer of funds to a gaming establishment account must be accounted for when reconciling the transactions associated with the gaming table, the gaming table component causes the generation of a receipt to memorialize the electronic transaction. For example, if a dealer at a gaming table redeems a quantity of gaming chips corresponding to the amount of funds electronically transferred to the player's gaming establishment account, the dealer deposits the printed receipt into a dropbox at the gaming table such that at the end of the dealer's shift, the gaming chip tray is balanced when accounting for the cash which the dealer exchanged for gaming chips and the electronic fund transfers which the dealer exchanged and/or redeemed for gaming chips. In another example, if a gaming establishment mobile staff member servicing an area with multiple gaming tables redeems a quantity of gaming chips corresponding to the amount of funds electronically transferred to the player's gaming establishment account, the mobile staff member deposits the printed receipt into a pouch or folder they carry with them such that at the end of the mobile staff member's shift, the gaming chips in the possession of the mobile staff member is balanced when accounting for the cash which the mobile staff member exchanged for gaming chips and the electronic fund transfers which the mobile staff member exchanged and/or redeemed for gaming chips.

Accordingly, the present disclosure supports the bi-directional transfer of funds to and from a gaming table thus providing for a relatively more efficient gaming experience for players (e.g., a player does not need to first obtain cash to bring to a gaming table to be exchanged for gaming chips) and overcomes certain security concerns (e.g., players and/or gaming establishment personnel carrying large sums of cash) associated with both cash-based gaming and ticket voucher-based gaming. Such a configuration further reduces the use of paper ticket vouchers (which certain gaming table dealers may accept for gaming chips) and any ink associated with the production of such paper ticket vouchers to reduce the amount of waste produced by gaming establishments. Such a reduction in the amount of waste produced by gaming establishments provides an environmental benefit of implementing the system disclosed herein.

Funds Transferred to Gaming Establishment Fund Management Account

In various embodiments, prior to transferring an amount of funds to and from a gaming establishment account to a gaming table component an amount of funds must first be established or otherwise deposited in the gaming establishment account.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the player establishes a gaming establishment fund management account by a deposit of funds (such as at a kiosk) to be subsequently utilized in association with the mobile device application. In other embodiments, the gaming establishment fund management account is funded via a mobile device electronic fund transfer, such using Apple Pay™ or Android Pay™. It should be appreciated that in different embodiments, the system utilizes a mobile device running a mobile device application, a kiosk, an electronic gaming machine, a gaming table component, a remote host controller service window displayed and/or a gaming establishment interface to facilitate the transfer of funds from a third-party account.

In certain embodiments, the system enables funds to be deposited in a gaming establishment fund management account via a gaming table component (or an electronic gaming machine ("EGM"). In certain embodiments, the system enables a player that has an amount of cash to utilize an EGM (or an kiosk) to convert the cash to an amount deposited into a gaming establishment fund management account (which may be subsequently transferred to the gaming table component utilizing a mobile device application). In other embodiments, the system enables funds to be deposited in a gaming establishment fund management account via an EGM (or an kiosk) that accepts printed ticket vouchers. In these embodiments, the system enables a player that has one or more printed ticket vouchers to utilize an EGM (or an kiosk) to convert the printed ticket voucher to an amount deposited into a gaming establishment fund management account (which may be subsequently transferred to the gaming table component utilizing a mobile device application).

In certain embodiments, the system enables funds to be deposited in a gaming establishment fund management account via a gaming establishment interface, such as a casino desk. In certain embodiments, the system enables a player that has an amount of cash to utilize a gaming establishment interface, such as a casino desk to convert the cash to an amount deposited into a gaming establishment fund management account (which may be subsequently transferred to a gaming table component utilizing a mobile device application). In other embodiments, the system enables funds to be deposited in a gaming establishment fund management account via a gaming establishment interface that accepts printed ticket vouchers. In these embodiments, the system enables a player that has one or more printed ticket vouchers to utilize a gaming establishment interface to convert the printed ticket voucher to an amount deposited into a gaming establishment fund management account (which may be subsequently transferred to a gaming table component utilizing a mobile device application).

In certain embodiments, the system enables funds to be deposited in a gaming establishment fund management account via a kiosk that accepts money. In certain embodiments, the system enables a player that has an amount of cash to utilize a kiosk to convert the cash to an amount deposited into a gaming establishment fund management account (which may be subsequently transferred to a gaming table component utilizing a mobile device application). In other embodiments, the system enables funds to be deposited in a gaming establishment fund management account via a kiosk that accepts printed ticket vouchers. In certain embodiments, the system enables a player that has one or more printed ticket vouchers to utilize a kiosk to convert the printed ticket voucher to an amount deposited into a gaming establishment fund management account (which may be subsequently transferred to a gaming table component utilizing a mobile device application).

In certain embodiments, the gaming establishment fund management account is associated with funds associated with one or more virtual ticket vouchers. In certain embodiments, the system enables a player associated with an amount of virtual ticket vouchers to utilize an gaming table component, a gaming table component, a mobile device running a mobile device application, a kiosk and/or a gaming establishment interface to convert the virtual ticket vouchers to an amount deposited into a gaming establishment fund management account. Detailed examples of virtual ticket vouchers and wireless communication protocols associated with such virtual ticket vouchers are described in: (i) U.S. Published Patent Application No. 2013/0023339, entitled "METHODS AND APPARATUS FOR PROVIDING SECURE LOGON TO A GAMING MACHINE USING A MOBILE DEVICE"; (ii) U.S. Published Patent Application No. 2014/0162768, entitled "METHODS AND APPARATUS FOR PROVIDING SECURE LOGON TO A GAMING MACHINE USING A MOBILE DEVICE"; (iii) U.S. Pat. No. 8,956,222, entitled "MOBILE DEVICE INTERFACES AT AN ELECTRONIC GAMING MACHINE"; (iv) U.S. Published Patent Application No. 2013/0260889, entitled "EMAILING OR TEXTING AS COMMUNICATION BETWEEN MOBILE DEVICE AND kiosk"; (v) U.S. Published Patent Application No. 2013/0065668, entitled "REDEMPTION OF VIRTUAL TICKETS USING A PORTABLE ELECTRONIC DEVICE"; (vi) U.S. Patent No. 2014/0121005, entitled "VIRTUAL TICKET-IN AND TICKET-OUT ON A GAMING MACHINE"; (vii) U.S. Published Patent Application No. 2013/0065678, entitled "RETROFIT DEVICES FOR PROVIDING VIRTUAL TICKET-IN AND TICKET-OUT ON A GAMING MACHINE"; (viii) U.S. Published Patent Application No. 2013/0065686, entitled "BILL ACCEPTORS AND PRINTERS FOR PROVIDING VIRTUAL TICKET-IN AND TICKET-OUT ON A GAMING MACHINE"; (ix) U.S. Pat. No. 8,961,306, entitled "FEEDBACK TO PLAYER OF DEVICE CONNECTION STATE"; (x) U.S. Pat. No. 8,613,668, entitled "DIRECTIONAL WIRELESS COMMUNICATION"; (xi) U.S. Published Patent Application No. 2013/0316808, entitled "METHOD AND APPARATUS FOR ENTERING SENSITIVE DATA FOR AN ELECTRONIC GAMING MACHINE FROM A PORTABLE ELECTRONIC DEVICE"; (xii) U.S. Pat. No. 8,622,836, entitled "USE OF WIRELESS SIGNAL STRENGTH TO DETERMINE CONNECTION"; and (xiii) U.S. Published Patent Application No. 2014/0248941, entitled "TRANSFER VERIFICATION OF MOBILE PAYMENTS".

In certain embodiments, the system enables a player to fund the gaming establishment fund management account independent of the mobile device and independent of the mobile device application. In certain other embodiments, the system enables a player to utilize a mobile device running a mobile device application to fund the gaming establishment fund management account. More specifically and utilizing the example of a kiosk, in one embodiment, to utilize a mobile device and a kiosk to facilitate the funding of a gaming establishment fund management account, the player wirelessly pairs or otherwise connects a mobile device with a kiosk. In one example embodiment, the player moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with a gaming table component as described herein.

After connecting the mobile device to the kiosk, the kiosk prompts the player to deposit an amount of funds into the kiosk. In one such embodiment, the kiosk prompts the player to insert one or more bills into a bill acceptor of the kiosk. In another such embodiment, the kiosk additionally or alternatively prompts the player to deposit a physical ticket voucher (associated with an amount of funds) into the kiosk. In another such embodiment, the kiosk additionally or alternatively prompts the player to deposit a card associated with an external account, such as a credit card or debit card into the kiosk. In another such embodiment, the kiosk additionally or alternatively prompts the player to enter information associated with an external account, such as a credit card account, a PayPal® account, a Venmo® account, or a debit card account into the kiosk. In another such embodiment, the kiosk additionally or alternatively prompts the player to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the player to transfer the deposited amount of funds (e.g., a "Load Phone Now" button) or continue to deposit additional amounts of funds with the kiosk. In another embodiment, for each amount of funds accepted by the kiosk, such as for each bill or unit of currency accepted by the kiosk, a virtual ticket voucher is created and deposited in the gaming establishment fund management account.

In certain embodiments, upon receiving an amount of funds from the player and the player indicating to transfer the deposited amount of funds in association with the mobile device application, the kiosk communicates with one or more servers to transfer an amount of money to a gaming establishment fund management account (to be drawn upon from the mobile device application as described herein). In another such embodiment, upon receiving an amount of funds from the player and the player indicating to transfer the deposited amount of funds in association with an account or balance associated with the mobile device application, the kiosk communicates with one or more servers, such as a virtual ticket voucher server, to create a virtual ticket voucher associated with the amount of received currency. The system disclosed herein transfers the created virtual ticket voucher to the gaming establishment fund management account.

Linking Mobile Device to Gaming Table Component

In various embodiments, in addition to establishing an amount of funds in one or more accounts of the system, the system disclosed enables funds to be transferred between different components within the system via the utilization of a mobile device. In these embodiments, prior to enabling a player to take any action related to the system (such as using a mobile device to facilitate a transfer of funds from a cashless wagering account to a gaming table component), a pairing or linkage occurs between the mobile device and the gaming table component. The pairing or linkage between the mobile device and the gaming table component occurs via one or more applications being run or executed on the mobile device.

In certain embodiments, the mobile device application utilized to transfer funds to and from a gaming table component is a location based digital wallet enabled application, such as a Passbook-enabled or Wallet-enabled application, which is accessible when the player enters a gaming establishment. In certain embodiments, the mobile device application utilized to transfer funds to and from a gaming table component is downloaded to the mobile device from an application store. In certain embodiments, the mobile device application utilized to transfer funds to and from a gaming table component is downloaded to the mobile device from one or more websites affiliated with the gaming establishment (which are accessible directly by the player and/or by a link opened when the player scans a QR code associated with the gaming table component).

In certain embodiments, after a player has opened an application on a mobile device and selected an action to be performed, the system determines if the mobile device application is associated with an active authorization token previously created by the system. In these embodiments, an authorization token is a time-based token which expires after a designated period of time and which is associated with an additional level of player authentication beyond a player's application username and application password.

If the system determines that the application is not associated with an active authorization token previously created by the system, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage the gaming table component, such as prompting the player to tap the mobile device to a designated portion of the gaming table component. It should be appreciated that any reference herein to a player tapping the mobile device to a designated portion of the gaming table component may or may not include the player pressing a fingerprint scanner (if the mobile device is equipped with such a fingerprint scanner) while concurrently engaging the gaming table component. In other embodiments, the mobile device application verifies the identifying information of the player by communicating with a verification/authentication server over one or more wireless communication protocols, such as WiFi protocol, a cellular communication protocol (e.g., 3G or LTE), to obtain the active authorization token.

In certain embodiments, following the player causing the mobile device to engage the gaming table component (e.g., the player taps the mobile device to a player tracking card reader or other designated location(s) of the gaming table component), the mobile device application communicates, via a wireless communication protocol, the provided identifying information and the requested action to be performed to the gaming table component. For example, upon the player tapping the mobile device to a player tracking card reader or other designated location(s) of the gaming table component (or otherwise moving the mobile device to within a designated distance of the player tracking card read or other designated locations(s) of the gaming table component), the mobile device application sends the identifying information and the requested action to a component of a gaming establishment management system located inside the gaming table component, such as a NexGen® player tracking component of an IGT Advantage® system. NexGen® and IGT Advantage® are trademarks of IGT, the Applicant of the present application.

Following the communication of the identifying information and the requested action to the gaming table component, the system determines if the identifying information is valid. For example, a designated system component configured to operate with a player tracking system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the gaming table component, such as tapping the mobile device to a designated portion of the gaming table component.

On the other hand, if the system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data to/from the gaming table component which is facilitated the mobile device. Such a designated amount of time which an authorization token remains valid enables the player to move from one gaming table (associated with one gaming table component) to another gaming table (associated with another gaming table component) and, as described below, transfer funds to/from each gaming table component and a gaming establishment account, without having to reprovide such identifying information each time the player switches gaming tables. That is, the mobile device application disclosed herein is configured to communicate with one or more gaming table components (without having to reauthenticate itself repeatedly) during the designated amount of time which the authorization token remains valid.

Following the creation of an authorization token, the system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the gaming table component, such as a NexGen® player tracking component of an IGT Advantage® system, communicates the created authorization token to the mobile device and proceeds with executing the requested action.

On the other hand, following a determination that the mobile device application is associated with a previously created and stored authentication token, the mobile device application prompts the player to cause the mobile device to engage the gaming table component, such as prompting the player to tap the mobile device to a designated portion of the gaming table component.

Following the player causing the mobile device to engage the gaming table component (e.g., the player taps the mobile device to a player tracking card reader or other designated location(s) of the gaming table component), the mobile device application communicates, via a wireless communication protocol, the previously stored authorization token and the requested action to be performed to the gaming table component. For example, upon the player tapping the mobile device to a player tracking card reader or other designated location(s) of the gaming table component, the mobile device application sends the stored authorization token and the requested action to a component of a gaming establishment management system located inside the gaming table component, such as a NexGen® player tracking component of an IGT Advantage® system.

Following the communication of the stored authorization token and the requested action to the gaming table component, the system determines if the communicated authorization token is still valid. For example, a system component configured to operate with a player tracking system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the component of a gaming establishment management system located inside the gaming table component proceeds with executing the requested action and communicates a requested action response to the mobile device.

In certain embodiments, the system enables a player to interact with the gaming table component via the mobile device as described herein, without having to continually reengage the gaming table component with the mobile device for each requested action. In these embodiments, after initially establishing a secure connection with the gaming table component, subsequent interactions between the mobile device application and the gaming table component occur without any subsequent physical interaction between the mobile device and the gaming table component. That is, to avoid having the player retrieve the mobile device and repeat the physical operation of engaging the gaming table component with the mobile device, certain embodiments enable the player to execute one or more functions without repeating the above-described physical operation of engaging the gaming table component with the mobile device. In certain such embodiments, the mobile device application utilizes one or more display devices of the gaming table component to display to the player information and/or player selectable prompts which are otherwise displayable via the display device of the mobile device.

In certain other embodiments, for each interaction or requested action between the gaming table component and the mobile device described herein, the system requires the player to reengage the gaming table component with the mobile device to reestablish or confirm the pairing between the gaming table component and the mobile device. In certain other embodiments, for each interaction between the gaming table component and the mobile device that occur a designated amount of time after the last engagement of the gaming table component with the mobile device, the system requires the player to reengage the gaming table component with the mobile device to reestablish or confirm the pairing between the gaming table component and the mobile device.

Utilizing Paired Mobile Device Application

In various embodiments, after pairing the mobile device with the gaming table component, the mobile device application communicates one or more requested actions to be performed to the gaming table component. As described herein, such requested actions generally pertain to an action associated with a player account, or an action associated with an initiation of a transfer of funds. It should be appreciated that while certain data or information pertaining to one or more of the requested actions are communicated from a gaming table component (or a component of a gaming establishment management system supported by or otherwise located inside the gaming table component) to a mobile device, such data or information may additionally or alternatively be communicated: (i) from one or more servers to a mobile device via one or more wireless communication protocols, or (ii) from a gaming table component to one or more servers via one or more wireless communication protocols and then from one or more servers to a mobile device via one or more wireless communication protocols.

It should additionally be appreciated that the mobile device facilitated gaming table component to/from a gaming establishment account fund data transfers of the present disclosure may occur in addition to or as an alternative from cash-based fund transfers and/or ticket voucher-based fund transfers. In one such embodiment, an amount of funds transferred to a gaming table component (to be provided by a gaming establishment personnel as gaming chips) is funded via any of a mobile device facilitated fund transfer, a cash-based fund transfer or a ticket voucher-based fund transfer. In another embodiment, an amount of funds transferred from a gaming table component (which resulted from an exchange of gaming chips by a gaming establishment personnel) is cashed out via any of a mobile device facilitated fund transfer, a cash-based fund transfer or a ticket voucher-based fund transfer. In another embodiment, an amount of funds transferred to a gaming table component (to be provided by a gaming establishment personnel as gaming chips) is funded via a mobile device facilitated fund transfer or a cash-based fund transfer (but is not funded via any ticket voucher-based fund transfer). In another embodiment, an amount of funds transferred from a gaming table component (which resulted from an exchange of gaming chips by a gaming establishment personnel) is cashed out via a mobile device facilitated fund transfer or a cash-based fund transfer (but is not cashed out via any ticket voucher-based fund transfer). In another embodiment, an amount of funds transferred to a gaming table component (to be provided by a gaming establishment personnel as gaming chips) is funded via a mobile device facilitated fund transfer or a ticket voucher-based fund transfer (but is not funded via any cash-based fund transfer). In another embodiment, an amount of funds transferred from a gaming table component (which resulted from an exchange of gaming chips by a gaming establishment personnel) is cashed out via a mobile device facilitated fund transfer or a ticket voucher-based fund transfer (but is not cashed out via any cash-based fund transfer). In another embodiment, an amount of funds transferred to a gaming table component (to be provided by a gaming establishment personnel as gaming chips) is funded via a mobile device facilitated fund transfer (but is not funded via a cash-based fund transfer nor a ticket voucher-based fund transfer). In another embodiment, an amount of funds transferred from a gaming table component (which resulted from an exchange of gaming chips by a gaming establishment personnel) is cashed out via a mobile device facilitated fund transfer (but is not cashed out via a cash-based fund transfer nor a ticket voucher-based fund transfer).

It should be further appreciated that any functionality or process described herein may be implemented via one or more servers, one or more gaming table components, one or more gaming establishment components (such as a component of a gaming establishment management system (e.g., a player tracking unit) supported by or otherwise located inside the gaming table component), or a mobile device application. For example, while certain data or information described herein is explained as being communicated from a gaming table component or a gaming establishment component (such as a component of a gaming establishment management system (e.g., a player tracking unit) supported by or otherwise located inside the gaming table component) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming table component, such functions, features or processes may alternatively be performed by one or more servers, or one or more mobile device applications, or one or more gaming establishment components (such as a component of a gaming establishment management system (e.g., a player tracking unit) supported by or otherwise located inside the gaming table component), (ii) while certain functions, features or processes are described herein as being performed by one or more mobile device applications, such functions, features or processes may alternatively be performed by one or more servers, or one or more gaming table components, or one or more gaming establishment components (such as a component of a gaming establishment management system (e.g., a player tracking unit) supported by or otherwise located inside the gaming table component), (iii) while certain functions, features or processes are described herein as being performed by one or more servers, such functions, features or processes may alternatively be performed by one or more gaming table components, or one or more mobile device applications, or one or more gaming establishment components (such as a component of a gaming establishment management system (e.g., a player tracking unit) supported by or otherwise located inside the gaming table component)), and (iv) while certain functions, features or processes are described herein as being performed by one or more gaming establishment components (such as a component of a gaming establishment management system (e.g., a player tracking unit) supported by or otherwise located inside the gaming table component), such functions, features or processes may alternatively be performed by one or more gaming table components, or one or more mobile device applications, or one or more servers.

Player Accounts

In certain embodiments, as described above, the action to be performed includes enabling the player to log into a casino loyalty account, such as a player tracking account, via a wireless communication protocol, utilizing the mobile device application.

In certain embodiments, the action to be performed includes enabling the player to log out of a casino loyalty account, such as a player tracking account, via a wireless communication protocol, utilizing the mobile device application. In different embodiments, upon receiving one or more "cash out" inputs from the player, if the system determines that no activity has occurred for a designated amount of time, or if the system determines that another player is attempting to log onto the gaming table component, the mobile device application facilitates a logging out of the casino loyalty account. Such logging out of the casino loyalty account is associated with a termination of the player's current gaming session. Specifically, the gaming table component proceeds with operating with a player loyalty system (i.e., a player tracking system) to log the player out of the player loyalty account at that gaming table to complete the player tracking session at the gaming table component In certain embodiments, the action to be performed additionally or alternatively includes enabling the player to log into a gaming establishment account, such as a cashless wagering account, via a wireless communication protocol, utilizing the mobile device application. In certain such embodiments, following the player selecting an image associated with an electronic casino loyalty account card stored via a digital wallet application or following the mobile device application retrieving data associated with a gaming establishment account stored via a digital wallet application, the mobile device application prompts the player to cause the mobile device to engage the gaming table component, such as prompting the player to tap the mobile device to a card reader or other designated location(s) of the gaming table component. After such engagement (or after the launching of the mobile device application if no mobile device to gaming table component engagement is required), the mobile device application communicates, via a wireless communication protocol, player gaming establishment account data stored by the mobile device to the gaming table component. The gaming table component proceeds with operating with the gaming establishment fund management system to log the player into a gaming establishment account associated with the player. In one embodiment, the system determines a balance of the gaming establishment account (in terms of both cashable credits and non-cashable credits) associated with the player and causes the gaming table component to communicate, via one or more wireless communication protocols, the determined gaming establishment account balance to the mobile device.

In another embodiment, the system determines balance(s) of the gaming establishment account associated with the player and communicates, via one or more wireless communication protocols, the determined gaming establishment account balance(s) to the mobile device.

Fund Transfers

In certain embodiments, as described above, the action to be performed additionally or alternatively includes enabling the player to facilitate the transfer of funds from a gaming establishment account to the gaming table component utilizing the mobile device application.

In certain embodiments, the action to be performed additionally or alternatively includes enabling the player to transfer funds from a virtual ticket voucher to the gaming table component utilizing the mobile device application. In certain embodiments, following the launching of the mobile device application, such as following the player selecting an image associated with an electronic casino loyalty account card stored via a digital wallet application, the mobile device application determines an amount of funds to be transferred to the gaming table component via the redemption of a virtual ticket voucher. In these embodiments, the mobile device application displays to the player images representing any virtual ticket vouchers associated with the mobile device. The mobile device application enables the player to select one or more images representing one or more virtual ticket vouchers associated with the mobile device. In these embodiments, similar to as described above with respect to the transfer of funds from a gaming establishment account to a gaming table component via a mobile device application, following the determination of which virtual ticket vouchers are to be transferred from the mobile device application to the gaming table component, the mobile device application prompts the player to cause the mobile device to engage the gaming table component. The mobile device application then communicates, via a wireless communication protocol, data associated with the selected virtual ticket voucher to be transferred. The gaming table component then communicates with one or more servers, such as a virtual ticket voucher server, to request the selected virtual ticket voucher (and more specifically the amount of funds associated with the selected virtual ticket voucher) be transferred from to the gaming table component. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the gaming table component proceeds with updating a balance of the gaming table component (attributable to the player and redeemable for gaming chips) to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain embodiments, the action to be performed additionally or alternatively includes transferring non-cashable credits to the gaming table component utilizing the mobile device application. In various embodiments, the system includes transferring non-cashable credits to a gaming table component in association with a fund transfer to a cashless wagering account from a gaming establishment retail account which is part of a gaming establishment retail system. In these embodiments, the gaming establishment retail account is a retail account with a balance or a pre-paid access account which, per current regulations from the U.S. Treasury Department Financial Crimes Enforcement Network ("FinCEN"), cannot be convertible to cash and can only be used for the purchase of goods and/or services. Such a gaming establishment retail account (i.e., a gaming establishment retail wallet) of a gaming establishment retail system integrates with various retail point-of-sale systems throughout the gaming establishment to enable players/users to purchase goods and/or services via the player's gaming establishment retail account. It should be appreciated that once an amount of funds is deposited in a gaming establishment retail account, certain regulations dictate that such funds cannot be converted back to cashable funds. That is, while an amount of funds deposited in a gaming establishment retail account may be used with various retail point-of-sale systems throughout the gaming establishment to enable players/users to purchase goods and/or services and can further be used to fund a cashless wagering account with an amount of non-cashable credits, such funds deposited in the gaming establishment retail account cannot be converted to cash.

Securing Transactions Between Mobile Device and Gaming Table Component

While the facilitation of the transfer of funds to and from an gaming table component via a mobile device has many advantages described herein, certain security concerns arise when transferring fund data wirelessly between an gaming table component and a mobile device (or between an gaming table component and the mobile device via one or more servers). For example, a malicious person may attempt to intercept such a wireless communication and steal the funds being transferred. Such a malicious person may devise electronics, such as an antenna or other electronics placed on or near the gaming table component to insert their mobile device between a "cash out" input and the mobile device engaging the gaming table component.

More specifically, when facilitating the transfer of deposited funds and/or an amount of winnings from the gaming table component to a gaming establishment account via the mobile device application, a player initiates an engagement of the gaming table component with the mobile device, such as tapping the mobile device to a player tracking card reader or other designated location(s) of the gaming table component. However, before the engagement of the gaming table component with the player's mobile device is complete, an intruder utilizes such devised electronics to beat the player to the completion of the engagement. In this example, when the player subsequently actuates a "cash out" button on the gaming table component, the gaming table component proceeds with transferring the amount of the credit balance of the mobile device of the intruder. Such a concern is also present when a player attempts to wirelessly transfer funds to an gaming table component via a mobile device wherein the intruder device intercepts such a transfer and reroutes the funds to the mobile device of the intruder.

In view of these security concerns, certain embodiments of the present disclosure utilize a time window, such as ten seconds, in association with one or more requested actions. In one such embodiment, after receiving an initiation of an engagement of the gaming table component with the mobile device, the gaming table component assigns or otherwise associates a time window with such an engagement. If one mobile device is attempted to be paired with the gaming table component within the associated time window before an action is requested, the gaming table component determines that only one mobile device is communicating with the gaming table component and the gaming table component proceeds with executing the requested action, such as a requested fund transfer as described herein. On the other hand, if more than one mobile device is attempted to be paired with the gaming table component within the associated time window before an action is requested, the gaming table component determines that an intruder device may be present. In such a situation, the gaming table component cancels the requested action and/or prompts the player to reengage the gaming table component with the mobile device.

In another such embodiment, after receiving a requested action from the mobile device, the gaming table component assigns or otherwise associates a time window with such a requested action. Following the requested action, if one mobile device is attempted to be paired with the gaming table component within the associated time window, the gaming table component determines that only one mobile device is communicating with the gaming table component and the gaming table component proceeds with executing the requested action, such as a requested fund transfer as described herein. On the other hand, following the requested action, if more than one mobile device is attempted to be paired with the gaming table component within the associated time window, the gaming table component determines that an intruder device may be present. In such a situation, the gaming table component cancels the requested action and/or prompts the player to reengage the gaming table component with the mobile device.

It should be appreciated that in addition to thwarting an isolated attempt by an intruder to intercept a wireless fund transfer, the system is configured to identify if a device is involved in multiple attempted engagements with an gaming table component over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

Mobile Device/Gaming Table Component Communications

As indicated above, in various embodiments, the insertion and removal of an electronic player tracking card (i.e., the logging in and logging out of the player from the player tracking system), and/or the facilitation of the transfer of funds between a gaming establishment account maintained for a player and an gaming table component is accomplished by one or more wireless communication protocols between the gaming table component and the mobile device. In such embodiments, the gaming table component of the present disclosure includes one or more mobile device interfaces for communicating with a mobile device utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

In certain embodiments, communication with the mobile device can occur through one or more wireless interfaces of the gaming table component. Such wireless interfaces are configured to receive information, such as information associated with one or more accounts and instructions to initiate a transfer of funds to and from a gaming establishment account and the gaming table component utilizing a mobile device.

In one embodiment, the wireless interface is integrated into the cabinet of the gaming table component and the gaming table component processor is configured to communicate directly with and send control commands to the wireless interface. In another embodiment, the wireless interface is integrated into a device mounted to and/or within the gaming table component cabinet, such as a player tracking unit or a player identification device of a player tracking unit. In certain embodiments where the wireless interface is embedded in a secondary device, such as a player tracking unit, the gaming table component processor sends control commands to control the wireless interface via a secondary controller, such as a player tracking controller.

In certain embodiments disclosed herein, the wireless interface implements an NFC protocol to facilitate the insertion and removal of an electronic player tracking card (i.e., the logging in and logging out of the player from the player tracking system) and/or the transfer of funds between a gaming establishment account maintained for a player and an gaming table component.

In certain embodiments utilizing an NFC implementation, the mobile device communicates with the gaming table component via an NFC protocol. For example, the gaming table component housing (which includes the gaming table component and various system components) operates with a gaming establishment management system that operates with one or more servers, such as one or more accounting servers, patron management servers, and cashless wagering servers.

In certain embodiments which utilize the NFC implementation, the mobile device application registers a mobile device application with one or more processors of the mobile device. In these embodiments, when the mobile device is detected by an NFC reader of a component of a gaming establishment management system located inside the gaming table component, such as a NexGen® player tracking component of an IGT Advantage® system, the component of the gaming establishment management system located inside the gaming table component communicates one or more data messages to the mobile device (or to one or more servers which then communicate such data messages to the mobile device). Such data messages are commands generated by the component of the gaming establishment management system located inside the gaming table component when the mobile device is detected in the NFC reader field. The processor of the mobile device communicates the data message to the mobile device application. The mobile device application responds, such as by communicating a triggering message, and a communication channel is opened between the component of the gaming establishment management system located inside the gaming table component and the mobile device application (or between the component of the gaming establishment management system located inside the gaming table component, one or more servers and the mobile device application). This open communication channel enables the component of the gaming establishment management system located inside the gaming table component to send, though the NFC reader, additional data messages to the mobile device (or to the mobile device via one or more servers) which are responded to by the mobile device application of the mobile device.

It should be appreciated that as long as the mobile device remains within the NFC field, the component of the gaming establishment management system located inside the gaming table component is configured to communicate with the mobile device and send data, such as status updates, as necessary. However, once the mobile device is removed from the NFC field, the communication channel is closed and such status updates are discontinued.

In various embodiments, the component of the gaming establishment management system located inside the gaming table component is configured to communicate other commands to the mobile device. Such commands and/or messages include one or more of: (i) a Card Inserted message which confirms that the player is logged into the player tracking system (e.g., an electronic player tracking card is associated with the gaming table component); (ii) a Card Removed message which confirms that the player is logged out of the player tracking system (e.g., an electronic player tracking card is removed or no longer associated with the gaming table component); (iii) a New Card Scanned message which reports that a physical card is detected in the player tracking card reader; (iv) a PIN Status message which reports a personal identification number verification status; (v) a Transfer Status message which reports a transfer request status; (vi) a Balance Status message which reports a balance request status; and (vii) a Disconnect message which informs the mobile device application to drop the connection with the gaming table component, such as when the gaming table component cashout button is pressed, when the system determines that the player card is "abandoned" or when the gaming table component credit balance reaches zero and remains at zero for a designated period of time, such as thirty seconds.

In other embodiments, the wireless interface implements a Wi-Fi, cellular and/or Bluetooth™ communications protocol to facilitate the insertion and removal of an electronic player tracking card (i.e., the logging in and logging out of the player from the player tracking system) and/or the transfer of funds between a gaming establishment account maintained for a player and an gaming table component.

In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi pairing, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

In certain embodiments utilizing a Wi-Fi/Bluetooth™ communications protocol implementation, the mobile device communicates with the gaming table component via a Wi-Fi/Bluetooth™ communications protocol. For example, the gaming table component housing (which includes the gaming table component and various system components) operates with a gaming establishment management system that operates with one or more servers, such as one or more accounting servers, patron management servers, and cashless wagering servers.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the gaming table component, zero, one or more servers and a mobile device, such as secure pairing using one of these protocols. That is, in one embodiment, an NFC interface on an gaming table component can be used to set-up a higher speed communication between the gaming table component, zero, one or more servers and the NFC enabled mobile device. The higher speed communication rates can be used for expanded content sharing. For instance, an NFC and Bluetooth enabled gaming table component can be tapped by an NFC and Bluetooth enabled mobile device for instant Bluetooth pairing between the devices and zero, one or more servers. Instant Bluetooth pairing between an gaming table component, an NFC enabled mobile device and zero, one or more servers, can save searching, waiting, and entering codes. In another example, an gaming table component can be configured as an NFC enabled router, such as a router supporting a Wi-Fi communication standard. Tapping an NFC enabled mobile device to an NFC enabled and Wi-Fi enabled gaming table component can be used to establish a Wi-Fi connection between the devices and zero, one or more servers.

In certain embodiments which implement a Wi-Fi, cellular and/or Bluetooth™ communications protocol, the system utilizes one or more QR codes generated by the gaming table component to facilitate the communication of data between the mobile device and the system. In such embodiments, the QR code is used to identify the gaming table component that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the gaming table component. In these embodiments, a communication tunnel wrapper (i.e., a Wi-Fi/Bluetooth™ tunnel wrapper) is utilized to establish a connection between the system and the mobile device and to transport any data messages described herein between the gaming table component, zero, one or more servers and the mobile device.

More specifically, in certain embodiments, the player requests, via an input at the gaming table component and/or the mobile device, the generation of a QR code by the gaming table component. In response to the player's request, the gaming table component or a player tracking unit displays a QR code. In certain embodiments, the QR code includes a nonce which prevents a third-party (e.g., another player) from sniping the player's login attempt. Such an on-demand QR code remains valid for a designated amount of time such that if the player does not scan the QR code within the designated amount of time, another QR code is necessary to be scanned to connect the mobile device to the gaming table component.

In certain embodiments, the player scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the gaming table component, such as a new scanning of the QR code to send such a requested action from the mobile device to the gaming table component (or to send a requested action from the mobile device to one or more servers and then from one or more servers to the gaming table component).

In certain embodiments, following the scanning of a valid QR code, the mobile device application connects to one or more servers. Such servers use websockets secured with a transport layer security protocol or other similar mechanisms. In one such embodiment, the servers operate with one or more translators and zero, one or more components of the system, similarly using websockets secured with a transport layer security protocol, to communicate data to the gaming table component or a component of the gaming table component. It should be appreciated that in certain embodiments, one or more of the servers are scalable servers configured to scale to accept connections from thousands of mobile devices.

In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the player and directs the player to rescan the QR code.

In addition to the connect command communicated from the mobile device application to the system, the mobile device application of these embodiments is configured to send a disconnect command to the system. Such a disconnect command functions to tear-down the connection the server. That is, after the server receives the disconnect command from the mobile device application, the server sends this disconnect command to the translator and close the websocket to the mobile device application. In these embodiments, if the websocket is not closed or otherwise terminated within a designated period of time, such as five seconds, the mobile device application may retry communicating this command or close the websocket. It should be appreciated that if the mobile device connection is severed before this command is received by the system, the sever sends this command on behalf of the mobile device application.

In another embodiment, the mobile device application is configured to send a trigger command to the system, such as a component of the gaming establishment management system located inside the gaming table component. In this embodiment, the trigger command is associated with an action requested by the player, such as a transfer of funds to or from the gaming table component. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the player and enable the player to retry the requested action.

In other embodiments, the mobile device application communicates with the system through a tunnel established over the mobile device's Wi-Fi network or the mobile device's network connection. In such embodiments, the mobile device application will connect to one or more system servers that use websockets secured with a transport layer security protocol. The system server operates with one or more translators, similarly using websockets secured with a transport layer security protocol to communicate data to the gaming table component or a component of the gaming table component.

In certain embodiments that utilize the NFC communication protocol described herein, which utilize the Wi-Fi, cellular and/or Bluetooth™ communication protocols described herein and/or which utilize any other communication protocol described herein, any action requested by the player via the mobile device application requires a new engagement between the mobile device and the gaming table component, such as a new tap of the mobile device to a card reader or other designated location(s) of the gaming table component. In certain other embodiments that utilize the NFC communication protocol described herein, which utilize the Wi-Fi, cellular and/or Bluetooth™ communication protocols described herein and/or which utilize any other communication protocol described herein, certain actions requested by the player via the mobile device application require a new engagement between the mobile device and the gaming table component, such as a new tap of the mobile device to a card reader or other designated location(s) of the gaming table component and other actions requested by the player via the mobile device application do not require any new engagement between the mobile device and the gaming table component.

Gaming Table Components

The above-described embodiments of the present disclosure may be implemented in accordance with or in conjunction with one or more of a variety of different types of gaming table components, such as, but not limited to, a kiosk (or mobile gaming table component) and/or a kiosk (or mobile gaming table component) in combination with a central server, central controller, or remote host.

In certain embodiments, the gaming table component includes a gaming table component controller 312 configured to communicate with and to operate with a plurality of peripheral devices 322.

The gaming table component controller 312 includes at least one processor 310. The at least one processor 310 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information) via a communication interface 306 of the gaming table component controller 312; (2) converting signals read by an interface to a format corresponding to that used by software or memory of the gaming table component; (3) accessing memory to configure or reconfigure parameters in the memory according to indicia read from the gaming table component; (4) communicating with interfaces and the peripheral devices 322 (such as input/output devices); and/or (5) controlling the peripheral devices 322. In certain embodiments, one or more components of the gaming table component controller 312 (such as the at least one processor 310) reside within a housing of the gaming table component (described below), while in other embodiments at least one component of the gaming table component controller 312 resides outside of the housing of the gaming table component.

The gaming table component controller 312 also includes at least one memory device 316, which includes: (1) volatile memory (e.g., RAM 309, which can include non-volatile RAM, magnetic RAM, ferroelectric RAM, and any other suitable forms); (2) non-volatile memory 319 (e.g., disk memory, FLASH memory, EPROMs, EEPROMs, memristor-based non-volatile solid-state memory, etc.); (3) unalterable memory (e.g., EPROMs 308); (4) read-only memory; and/or (5) a secondary memory storage device 315, such as a non-volatile memory device, configured to store gaming software related information (the software related information and the memory may be used to store various audio files not currently being used and invoked in a configuration or reconfiguration). Any other suitable magnetic, optical, and/or semiconductor memory may operate in conjunction with the gaming table component disclosed herein. In certain embodiments, the at least one memory device 316 resides within the housing of the gaming table component (described below), while in other embodiments at least one component of the at least one memory device 316 resides outside of the housing of the gaming table component.

The at least one memory device 316 is configured to store, for example: (1) configuration software 314, such as all the parameters and settings on the gaming table component; (2) associations 318 between configuration indicia read from a gaming table component with one or more parameters and settings; (3) communication protocols configured to enable the at least one processor 310 to communicate with the peripheral devices 322; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the gaming table component to communicate with local and non-local devices using such protocols. In one implementation, the gaming table component controller 312 communicates with other devices using a serial communication protocol. A few non-limiting examples of serial communication protocols that other devices, such as peripherals (e.g., a bill validator or a ticket printer), may use to communicate with the gaming table component controller 312 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 316 is configured to store program code and instructions executable by the at least one processor of the gaming table component to control the gaming table component. The at least one memory device 316 of the gaming table component also stores other operating data, such as image data, event data, input data, or information, and/or applicable rules on the gaming table component. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in a gaming table component to implement at least part of the present disclosure. In other embodiments, part or all of the program code and/or the operating data is downloaded to the at least one memory device of the gaming table component through any suitable data network described above (such as an Internet or intranet).

The at least one memory device 316 also stores a plurality of device drivers 342. Examples of different types of device drivers include device drivers for gaming table component components and device drivers for the peripheral components 322. Typically, the device drivers 342 utilize various communication protocols that enable communication with a particular physical device. The device driver abstracts the hardware implementation of that device. For example, a device driver may be written for each type of card reader that could potentially be connected to the gaming table component. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the gaming table component loads the new device driver from the at least one memory device to enable communication with the new device. For instance, one type of card reader in the gaming table component can be replaced with a second different type of card reader when device drivers for both card readers are stored in the at least one memory device.

In certain embodiments, the software units stored in the at least one memory device 316 can be upgraded as needed. For instance, when the at least one memory device 316 is a hard drive, new parameters, new settings for existing parameters, new settings for new parameters, new device drivers, and new communication protocols can be uploaded to the at least one memory device 316 from the gaming table component controller 312 or from some other external device. As another example, when the at least one memory device 316 includes a CD/DVD drive including a CD/DVD configured to store options, parameters, and settings, the software stored in the at least one memory device 316 can be upgraded by replacing a first CD/DVD with a second CD/DVD. In yet another example, when the at least one memory device 316 uses flash memory 319 or EPROM 308 units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device 316 also stores authentication and/or validation components 344 configured to authenticate/validate specified gaming table component components and/or information, such as hardware components, software components, firmware components, peripheral device components, user input device components, information received from one or more user input devices, information stored in the at least one memory device 316, etc. Examples of various authentication and/or validation components are described in U.S. Pat. No. 6,620,047, entitled "Electronic Gaming Apparatus Having Authentication Data Sets".

In certain embodiments, the peripheral devices 322 include several device interfaces, such as: (1) at least one output device 320 including at least one display device 335; (2) at least one input device 330 (which may include contact and/or non-contact interfaces); (3) at least one transponder 354; (4) at least one wireless communication component 356; (5) at least one wired/wireless power distribution component 358; (6) at least one sensor 360; (7) at least one data preservation component 362; (8) at least one motion/gesture analysis and interpretation component 364; (9) at least one motion detection component 366; (10) at least one portable power source 368; (11) at least one geolocation module 376; (12) at least one user identification module 377; (13) at least one player/device tracking module 378; and (14) at least one information filtering module 379.

The at least one output device 320 includes at least one display device 335 configured to display any displayed by the gaming table component and any suitable information. In certain embodiments, the display devices are connected to or mounted on a housing of the gaming table component (described below).

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In certain embodiments, the at least one output device 320 is a sound generating device controlled by one or more sound cards. In one such embodiment, the sound generating device includes one or more speakers or other sound generating hardware and/or software configured to generate sounds.

The at least one input device 330 may include any suitable device that enables an input signal to be produced and received by the at least one processor 310 of the gaming table component.

In various embodiments, the at least one input device 330 includes a plurality of buttons that are programmable by the gaming table component operator to, when actuated, cause the gaming table component to perform particular functions. In certain embodiments, the at least one input device 330 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the gaming table component by touching the touch screen at the appropriate locations.

In embodiments including a player tracking system, as further described below, the at least one input device 330 includes a card reader in communication with the at least one processor of the gaming table component.

The at least one wireless communication component 356 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 356 transmits electrical, electromagnetic, or optical signals that carry digital data streams or analog signals representing various types of information.

The at least one wired/wireless power distribution component 358 includes components or devices that are configured to provide power to other devices. For example, in one embodiment, the at least one power distribution component 358 includes a magnetic induction system that is configured to provide wireless power to one or more user input devices near the gaming table component. In one embodiment, a user input device docking region is provided, and includes a power distribution component that is configured to recharge a user input device without requiring metal-to-metal contact. In one embodiment, the at least one power distribution component 358 is configured to distribute power to one or more internal components of the gaming table component, such as one or more rechargeable power sources (e.g., rechargeable batteries) located at the gaming table component.

In certain embodiments, the at least one sensor 360 includes at least one of: optical sensors, pressure sensors, RF sensors, infrared sensors, image sensors, thermal sensors, and biometric sensors. The at least one sensor 360 may be used for a variety of functions, such as: detecting movements and/or gestures of various objects within a predetermined proximity to the gaming table component; detecting the presence and/or identity of various persons (e.g., players, casino employees, etc.), devices (e.g., user input devices), and/or systems within a predetermined proximity to the gaming table component.

The at least one data preservation component 362 is configured to detect or sense one or more events and/or conditions that, for example, may result in damage to the gaming table component and/or that may result in loss of information associated with the gaming table component. Additionally, the data preservation system 362 may be operable to initiate one or more appropriate action(s) in response to the detection of such events/conditions.

The at least one motion/gesture analysis and interpretation component 364 is configured to analyze and/or interpret information relating to detected player movements and/or gestures to determine appropriate player input information relating to the detected player movements and/or gestures. For example, in one embodiment, the at least one motion/gesture analysis and interpretation component 364 is configured to perform one or more of the following functions: analyze the detected gross motion or gestures of a player; interpret the player's motion or gestures to identify instructions or input from the player. In other embodiments, at least a portion of these additional functions may be implemented at a remote system or device.

The at least one portable power source 368 enables the gaming table component to operate in a mobile environment. For example, in one embodiment, the gaming table component 300 includes one or more rechargeable batteries.

The at least one geolocation module 376 is configured to acquire geolocation information from one or more remote sources and use the acquired geolocation information to determine information relating to a relative and/or absolute position of the gaming table component. For example, in one implementation, the at least one geolocation module 376 is configured to receive GPS signal information for use in determining the position or location of the gaming table component. In another implementation, the at least one geolocation module 376 is configured to receive multiple wireless signals from multiple remote devices (e.g., gaming table components, servers, wireless access points, etc.) and use the signal information to compute position/location information relating to the position or location of the gaming table component.

The at least one user identification module 377 is configured to determine the identity of the current user or current owner of the gaming table component. For example, in one embodiment, the current user is required to perform a login process at the gaming table component in order to access one or more features. Alternatively, the gaming table component is configured to automatically determine the identity of the current user based on one or more external signals, such as an RFID tag or badge worn by the current user and that provides a wireless signal to the gaming table component that is used to determine the identity of the current user. In at least one embodiment, various security features are incorporated into the gaming table component to prevent unauthorized users from accessing confidential or sensitive information.

The at least one information filtering module 379 is configured to perform filtering (e.g., based on specified criteria) of selected information to be displayed at one or more displays 335 of the gaming table component.

In various embodiments, the gaming table component includes a plurality of communication ports configured to enable the at least one processor of the gaming table component to communicate with and to operate with external peripherals, such as: accelerometers, arcade sticks, bar code readers, bill validators, biometric input devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

Gaming Tables

In certain embodiments, as indicated above, the system employs one or more intelligent gaming tables or gaming chip tracking systems. In one embodiment, each intelligent gaming table enables one or more players to play one or more suitable games by placing one or more wagers utilizing such gaming chips. Such game play and/or wagering information is tracked by the intelligent gaming table and provided to a central server. In another embodiment, the central server is in communication with at least one player tracking system to identify at least one player currently placing at least one wager on at least one suitable game at at least one of the intelligent gaming tables in the system.

In another embodiment, the gaming tables utilized in the system are non-intelligent gaming tables wherein the gaming chip identification devices are not directly integrated or situated in or on the gaming tables. In this embodiment, one or more gaming chip identification devices are utilized to track each player's wagered gaming chips. In one such embodiment, gaming chip identification devices are located at, above or below the table. In another such embodiment, the gaming chip identification devices are attached to the gaming table or adjacent to the gaming table. In another such embodiment, the gaming chip identification devices are included in the gaming table. In these embodiments, gaming establishments do not have to purchase new gaming tables. Rather, gaming establishments may continue using the same gaming tables and install the intelligent table technology around one or more gaming tables.

Figure 4:
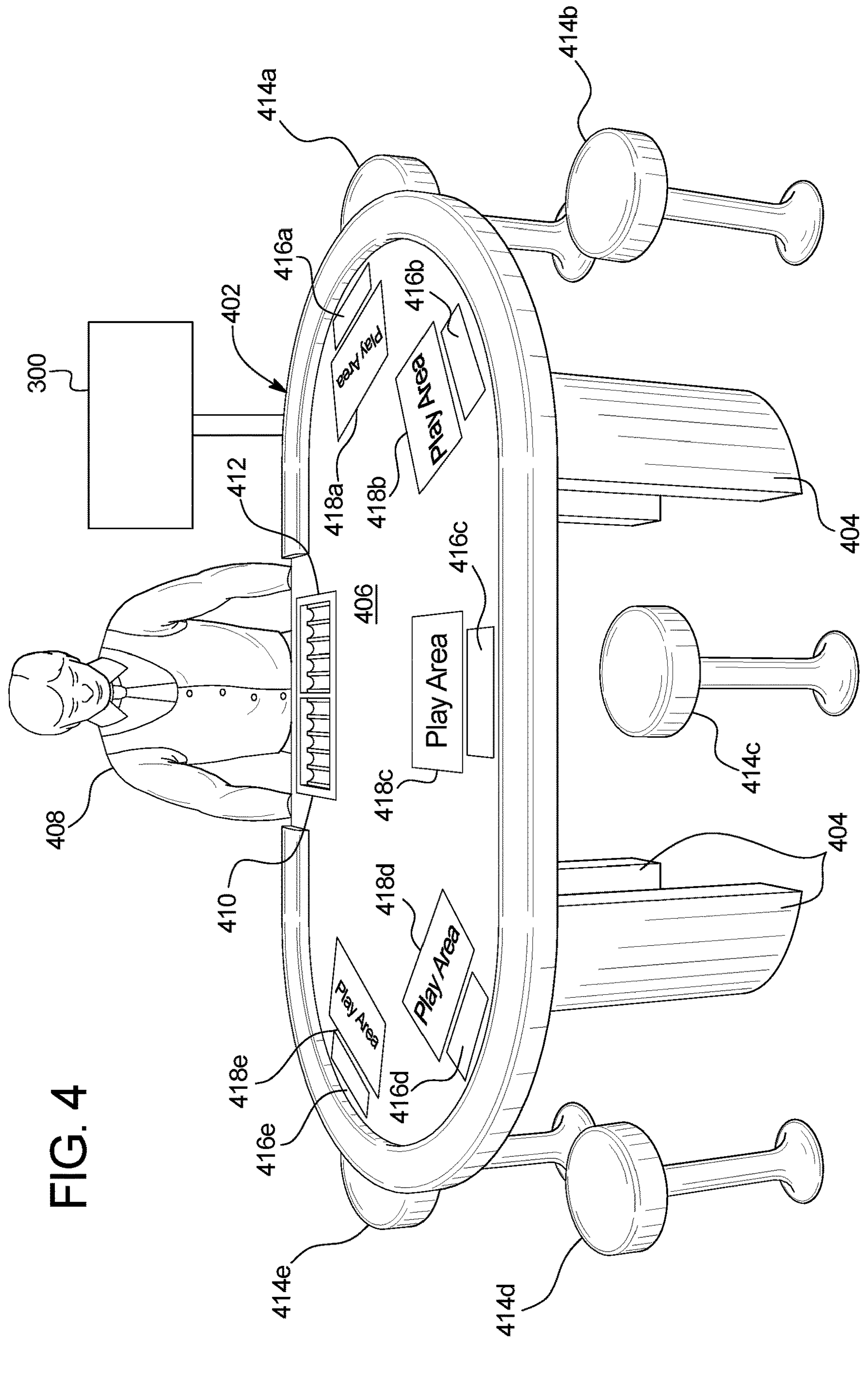
FIG. 4 is a perspective view of one embodiment of a gaming table of the present disclosure.

In one embodiment, as illustrated in FIG. 4, a gaming table 402 includes a suitable support structure 404, such as one or more legs, a playing surface 406 and a dealer position 408. In one embodiment, the dealer position includes two different gaming chip trays 410 and 412 for holding several stacks of the dealer's gaming chips. The dealer may use the gaming chip trays to collect and store gaming chips, make change for a player, and/or distribute gaming chips upon a gaming chip distribution event associated with the gaming table component 300. The gaming table includes a plurality of player stations or seats 414*a*, 414*b*, 414*c*, 414*d* and 414*e*. In this example, there are five player stations or seats. It should be appreciated that the gaming table may accommodate any suitable number of player positions and players so as not to interfere with game play. In one embodiment, the gaming table includes a plurality of gaming chip holding areas 416*a*, 416*b*, 416*c*, 416*d* and 416*e* where the players hold their gaming chips. In certain embodiment, the gaming tables include wagering areas (not illustrated) where players place their bets. It should be appreciated that the gaming table may also include a community wagering area (not illustrated) where each of the players place their wagers. In one embodiment, the gaming table also includes a plurality of playing areas 418*a*, 418*b*, 418*c*, 418*d* and 418*e* associated with each of the player stations.

In one embodiment, cards are dealt by the dealer substantially within the respective playing areas, such that cards dealt to a first player position are not confused with cards dealt to a second different player position. It should be appreciated that games played at the gaming tables may include any suitable card game or any suitable non-card game, such as roulette and craps. The gaming tables are operable to include any suitable apparatuses or components of the games. It should be appreciated that different gaming tables in the system may include the same game components or different game components.

In one embodiment, one or more gaming tables in the system each include at least one processor and at least one memory device, including, but not limited to the processors and memory devices of the gaming table component described above. In one embodiment, the system of gaming tables is integrated with one or more player tracking systems. In this embodiment, the system and/or player tracking system is operable to track any participating player's gaming activity at each gaming table of the system. In one such embodiment, the system and/or the associated player tracking system timely tracks when a player inserts their playing tracking card to begin a gaming session and also timely tracks when a player removes their player tracking card, stops playing at the gaming table or cashes out when concluding play for that gaming session. In another embodiment, the dealer or host logs the player in and out. In one such embodiment, at the start of a gaming session, the player hands the player's tracking card to the dealer and the dealer or host logs the player in and out for a gaming session. In different embodiments, the system works in accordance with the player tracking system to maintain data about players.

In other embodiments, rather than requiring a player to insert a player tracking card or enter identifying information, the gaming table utilizes one or more portable devices carried by a player, such as a cell phone, email communication device, a radio frequency identification tag or any other suitable wireless device to track when a player begins and ends a gaming session. In other embodiments, the gaming table utilizes any suitable biometric technology or ticket technology to track when a player begins and ends a gaming session. Each of the gaming tables may include any suitable number of player tracking input devices, such as card readers or key pads to enter identification numbers. In one embodiment, each player station or seat includes an individual player tracking input device. In another embodiment, a gaming table includes a single player tracking input device. In another embodiment, only a dealer has access to the player tracking input device and inputs all of each player's information.

It should be appreciated that the intelligent table system disclosed herein may include any suitable components or devices to monitor the players' gaming activity. That is, the intelligent table systems tracks how much a player wagers or how many gaming chips a player wagers, how much a player has won or lost, how many gaming chips the player has on the gaming table, or any other desired tracking information. In one embodiment, the intelligent table system also tracks this information for each and every game played by the player. It should be appreciated that the intelligent table system may include any suitable gaming table areas with gaming chip identification devices, any suitable method of identifying the gaming chips, and may use any suitable gaming chip reading technology.

In one embodiment, the intelligent gaming tables or gaming chip tracking systems tracks, monitors and records game play occurring at one or more gaming table player stations, regardless of which player is currently playing at each gaming station. In another embodiment, the intelligent gaming tables or gaming chip tracking systems tracks, monitors and records game play of one or more players at such gaming tables. In this embodiment, the player tracking system identifies players and records or saves the game play information provided by the intelligent tables in specific player accounts.

In another embodiment, the intelligent gaming table disclosed herein employs a virtual gaming table. The virtual gaming table provide virtual playing cards and/or virtual gaming chips which enable one or more players to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with wireless net-works to display and detect objects and movement. In this embodiment, as players move their hands or objects on the table top, the cameras translate the motions into commands.

It should be appreciated that values may be assigned to gaming chips in any suitable manner. In one embodiment, different denominations of gaming chips are visually different, such as having the value displayed on the gaming chip, having different sizes and/or having different weights. In another such embodiment, each gaming chip is associated with one of a plurality of different values. In this embodiment, the intelligent table system identifies the individual gaming chips (such as using RFID technology described herein), determines the placement of each gaming chip and sends the information to the player tracking system or central controller about each of the specific gaming chips. In one embodiment, the central server associates the value of the gaming chip with the player tracking account.

In one embodiment, each of the gaming chips has or is associated with an identification number. The intelligent table system determines the gaming chip identification number upon play or win of a gaming chip or upon the evaluation of all of the gaming chips in a player's gaming chip identification area. The intelligent table system sends the gaming chip information to the central server. The system associates the gaming chip number with the amount and the player. For example, a first player's gaming chip identification area includes gaming chip number 876543 which is associated with the value of $1, gaming chip number 876545 which is associated with the value of $5 and gaming chip number 876547 which is associated with the value of $10. In one embodiment, the intelligent table system determines which gaming chips are in which identification area and sends the information to the central server. The system associates the gaming chip numbers with their value and uses the information to determine one or more aspects of game play.

The intelligent table system disclosed herein is operable to use a variety of types of technology to track player activity. More specifically, in one embodiment, the intelligent table system is operable to include one or more gaming chip identifying devices. In one embodiment, the intelligent table system uses Infra-red signals received from table game gaming chips to track activity. In another embodiment, as indicated above, the intelligent table system employs RFID to track gaming chip activity. The RFID is a system that uses a small electronic device that includes a small gaming chip and an antenna. The gaming chips are scanned at the gaming table to retrieve the identifying information. In another embodiment, the system uses optical technology. The system may use any suitable other gaming chip identification devices, which may use any suitable gaming chip identification technology, to determine player gaming table wagering activities. The gaming chips are tracked for total gaming chip movement or wins and losses. When each gaming chip is placed in a gaming chip identification area, such as a betting circle or in a player's betting or wagering area, gaming chip identification devices recognizes the gaming chip and relays this data to the intelligent table system.

The system disclosed herein contemplates a plurality of different methods that the gaming chips may be used and/or identified during game play. In one embodiment, a gaming chip identification area is a gaming chip holding area. In one embodiment, intelligent table system identifies all of the gaming chips in a player's gaming chip holding area. For example, during game play, a player is required to have all gaming chips in that player's possession in a gaming chip holding area which each include one or more gaming chip identification devices. Upon a game play checkpoint, such as at a designated time interval, upon a triggering event, at the end of a play of a game or at the end of a gaming session, the intelligent table system surveys each of the player's gaming chip holding areas to identify the players' gaming chips.

In one embodiment, the gaming chip identification area is a wagering area. In one embodiment, the system includes gaming chip identification devices in each player's wagering area. The system identifies either the specific gaming chips wagered and won or loss by that player or the number of gaming chips wagered and won or loss by the player. For example, a player logs into the player tracking system via a card slot at the player's player station at a gaming table. When a player places a gaming chip in the wagering area associated with that player station, the intelligent table system identifies that gaming chip. When a dealer or host provides a gaming chip to a player for a win, the intelligent table system identifies the gaming chip.

In another embodiment, both the gaming chip holding area and the wagering area include gaming chip identification devices. That is, the system is operable to identify gaming chips in both the gaming chip holding area and the wagering area. Therefore, the system double checks or verifies each player's gaming activity.

In one embodiment, the system associates the gaming activity directly with players via player accounts. For example, at the start of play, the player logs into the player tracking system, such as by inserting a player tracking card into a card reader associated with their player station on the gaming table. In this embodiment, the intelligent table system associates any tracked data with the player's specific account. Thus, in certain embodiments, tracking player activity at the gaming table is similar in accuracy and thoroughness to the tracking done at slot machines.

Alternatively, the system determines the gaming chip count at each player station. That is, the system enables players to play anonymously and be associated with their current place at the table. For example, a player does not have to log in for one or more plays of a game but rather remains at a same player station for such plays of the game. The system associates the gaming chips with the player stations.

In certain embodiments, the intelligent table system includes one or more card readers or a card reading system. The card reading system knows what card comes out of the shoe and is dealt to what player. In one embodiment, the card reading system is a part of the intelligent table system. In another embodiment, the card reading system is separate from the intelligent table system and in association with the intelligent table system detects betting patterns and decisions to provide to the player tracking system. Such betting patterns and decisions may qualify the player to win one or more bonus awards. The card reading system can also reduce dealer error and or possible corruption by making sure that the players are paid properly for each and every hand. In certain embodiments, the intelligent table system knows the player cards, the dealer cards, and the bet, the intelligent table system is enabled to determine correct payouts for each and every player at the gaming table. In certain embodiments, the system employs safeguards to make sure the correct payout is made. For example, the system can send a halt play signal if an error is detected. It should be appreciated that in different embodiments the card reading system and the intelligent table system are integrated with or included in one or more tracking systems or player tracking systems.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. A gaming table component comprising:
a gaming table component processor; and
a gaming table component memory device that stores a plurality of instructions that, when executed by the gaming table component processor, cause the gaming table component processor to:
receive data associated with an amount of funds requested to be withdrawn from a gaming establishment account associated with a player, and
responsive to a receipt of data associated with an approval of a withdrawal of the amount of funds from the gaming establishment account, cause a display, by a display device, of the amount of funds.

2. The gaming table component of claim 1, wherein the display device comprises one of: a display device of a dealer workstation associated with a gaming table, and a display device of a mobile workstation independent of the gaming table.

3. The gaming table component of claim 1, wherein the data associated with the approval of the withdrawal of the amount of funds from the gaming establishment account is received from a server that maintains the gaming establishment account.

4. The gaming table component of claim 1, wherein the gaming establishment account comprises a cashless wagering account.

5. The gaming table component of claim 1, wherein the data associated with the amount of funds requested to be withdrawn from the gaming establishment account is received from at least one of: an input device associated with a gaming table and a mobile device executing a mobile device application.

6. The gaming table component of claim 1, wherein the received data associated with the amount of funds comprises data associated with a configuration of gaming table chips that correspond to the amount of funds.

7. The gaming table component of claim 1, wherein the gaming table component memory device comprises a plurality of further instructions that when executed by the gaming table component processor, cause the gaming table component processor to enable the receipt of the data associated with the amount of funds after an input is received at a dealer workstation associated with a gaming table.

8. The gaming table component of claim 1, wherein the gaming table component memory device comprises a plurality of further instructions that when executed by the gaming table component processor responsive to the amount of funds being displayed by the display device, cause the gaming table component processor to cause a printer to print a receipt.

9. The gaming table component of claim 1, wherein the gaming table component memory device comprises a plurality of further instructions that when executed by the gaming table component processor responsive to the amount of funds being displayed by the display device, cause the gaming table component processor to generate a virtual receipt.

10. A system comprising:
a processor; and
a memory device that stores a plurality of instructions that, when executed by the processor, cause the processor to:
receive data associated with an amount of funds to be withdrawn from a gaming establishment account associated with a player, and
responsive to a receipt of data associated with the requested amount of funds being approved by a server that maintains the gaming establishment account, cause a display, by a display device associated with a gaming table, of the amount of funds.

11. The system of claim 10, wherein the data associated with the amount of funds is received via at least one of: an input device associated with the gaming table and a mobile device executing a mobile device application.

12. A method of operating a gaming table component, the method comprising:
receiving data associated with an amount of funds requested to be withdrawn from a gaming establishment account associated with a player, and
responsive to a receipt of data associated with an approval of a withdrawal of the amount of funds from the gaming establishment account, causing a display, by a display device, of the amount of funds.

13. The method of claim 12, wherein the display device comprises one of: a display device of a dealer workstation associated with a gaming table, and a display device of a mobile workstation independent of the gaming table.

14. The method of claim 12, wherein the data associated with the approval of the withdrawal of the amount of funds from the gaming establishment account is received from a server that maintains the gaming establishment account.

15. The method of claim 12, wherein the gaming establishment account comprises a cashless wagering account.

16. The method of claim 12, wherein the data associated with the amount of funds requested to be withdrawn from the gaming establishment account is received from at least one of: an input device associated with a gaming table and a mobile device executing a mobile device application.

17. The method of claim 12, wherein the received data associated with the amount of funds comprises data associated with a configuration of gaming table chips that correspond to the amount of funds.

18. The method of claim 12, further comprising enabling, by a gaming table component processor, the receipt of the data associated with the amount of funds after an input is received at a dealer workstation associated with a gaming table.

19. The method of claim 12, further comprising, responsive to the amount of funds being displayed by the display device, causing a printer to print a receipt.

20. The method of claim 12, further comprising, responsive to the amount of funds being displayed by the display device, generating, by a gaming table component processor, a virtual receipt.

* * * * *